United States Patent
Shimura

(10) Patent No.: US 11,976,175 B2
(45) Date of Patent: May 7, 2024

(54) SPLIT CROSSLINKED POLYOLEFIN FOAM COMPOSITION AND METHOD

(71) Applicant: SEKISUI VOLTEK, LLC, Coldwater, MI (US)

(72) Inventor: Keigo Shimura, Coldwater, MI (US)

(73) Assignee: SEKISUI VOLTEK, LLC, Coldwater, MI (US)

( * ) Notice: Subject to any disclaimer, the term of this patent is extended or adjusted under 35 U.S.C. 154(b) by 654 days.

(21) Appl. No.: 16/699,063

(22) Filed: Nov. 28, 2019

(65) Prior Publication Data

US 2021/0163705 A1    Jun. 3, 2021

(51) Int. Cl.
*C08J 9/36*    (2006.01)
*B29C 44/56*    (2006.01)

(52) U.S. Cl.
CPC ............. *C08J 9/36* (2013.01); *C08J 2205/05* (2013.01); *C08J 2205/052* (2013.01);
(Continued)

(58) Field of Classification Search
CPC .... C08J 9/36; C08J 2205/05; C08J 2205/052; C08J 2323/06; C08J 2323/08;
(Continued)

(56) References Cited

U.S. PATENT DOCUMENTS 4,781,774 A * 11/1988 Steward ................ B29C 48/07
156/254
5,883,144 A    3/1999 Bambara et al.
(Continued)

FOREIGN PATENT DOCUMENTS

EP    0609721 A2    8/1994
EP    0286571 B1    12/1994
(Continued)

OTHER PUBLICATIONS

Foam Factory, Inc., "Difference between open cell and closed cell foam," Aug. 13, 2017 https://web.archive.org/web/20170813180702/https://www.foambymail.com/difference-between-open-cell-and-closed-cell-foam.html.
(Continued)

*Primary Examiner* — Maria V Ewald
*Assistant Examiner* — Daniel P Dillon
(74) *Attorney, Agent, or Firm* — Campbell IP Law LLC

(57) ABSTRACT

A process for producing split crosslinked polyolefin sheets comprises producing a crosslinked polyolefin foam sheet having an opposing first surface region and second surface region, and an intermediate region disposed therebetween, wherein the intermediate region is configured to have a gel content lower than an average gel content of the first surface region and the second surface region, and an average cell size larger than an average cell size of the first surface region and the second surface region; and applying a splitting force to the crosslinked foam sheet such that a controlled tear propagation travels through the intermediate region until a first side of the crosslinked polyolefin foam sheet and a second side of the crosslinked polyolefin foam sheet are separated to produce two split polyolefin foam sheets. The split crosslinked polyolefin foam sheets may comprise a skin side comprising a closed cell surface, and a split side comprising an open cell surface having peak heights of about 150 μm to about 550 μm.

21 Claims, 16 Drawing Sheets

(52) U.S. Cl.
CPC ........ *C08J 2323/06* (2013.01); *C08J 2323/08* (2013.01); *C08J 2323/12* (2013.01); *C08J 2329/14* (2013.01)

(58) Field of Classification Search
CPC ................ C08J 2323/12; C08J 2329/14; C08J 2331/04; C08J 9/103; C08J 9/34; C08J 2201/026; C08J 9/00; C08J 9/38; C08J 2205/048; C08J 2205/06; C08J 2205/08; C08J 2205/10; B29C 44/5654; B29K 2105/045; Y10T 156/1059
See application file for complete search history.

(56) References Cited

U.S. PATENT DOCUMENTS

| | | | |
|---|---|---|---|
| 6,984,216 | B2 | 1/2006 | Sendijarevic et al. |
| 2002/0155275 | A1 | 10/2002 | Kobayashi et al. |
| 2003/0082364 | A1 | 5/2003 | Jary et al. |
| 2015/0218331 | A1 | 8/2015 | Low |
| 2017/0282430 | A1* | 10/2017 | Baldwin .................. C08J 9/103 |

FOREIGN PATENT DOCUMENTS

| | | |
|---|---|---|
| EP | 0994167 B1 | 11/2003 |
| EP | 3225374 B1 | 3/2022 |
| GB | 738494 A | 10/1955 |
| GB | 1357765 A | 6/1974 |
| JP | H02145323 A | 6/1990 |
| JP | H0912762 A | 1/1997 |
| JP | 2001138422 A | 5/2001 |
| JP | 2004204154 A | 7/2004 |
| JP | 2010031137 A | 2/2010 |

OTHER PUBLICATIONS

1 Extended European Search Report, Application No. 20892318.5, mailed Nov. 28, 2023, 48 pages.

* cited by examiner

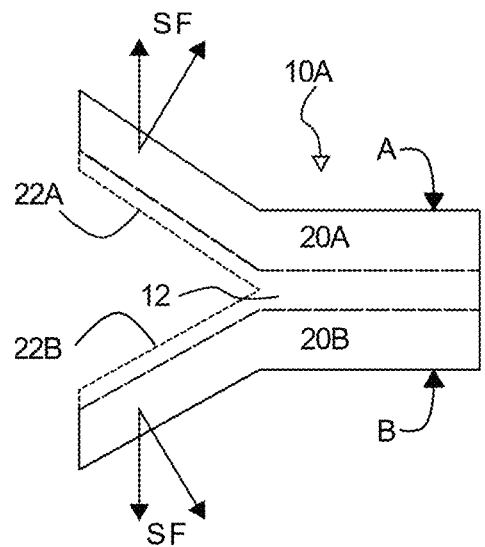
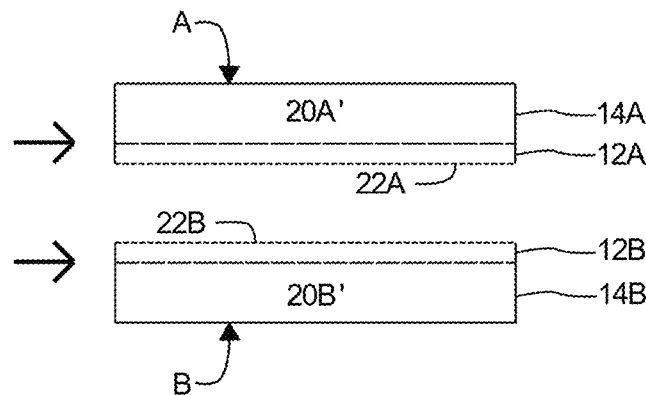
FIG. 5A
FIG. 5B
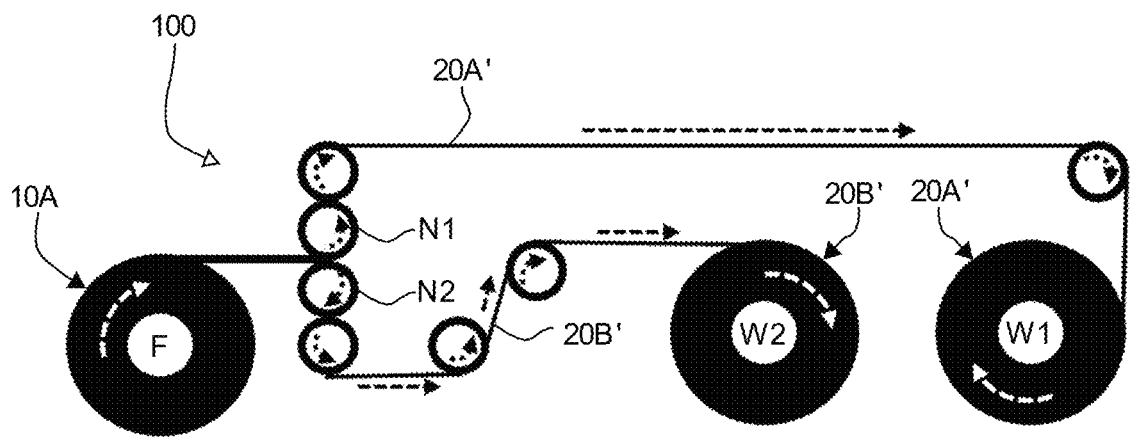
FIG. 6

SPLIT CROSSLINKED POLYOLEFIN FOAM COMPOSITION AND METHOD

PRIORITY CLAIMS

None.

BACKGROUND

The present disclosure relates in general to polyolefin foams, and more particularly, to high recovery and splittable large core cell polyolefin foams and methods of producing the same, wherein the foams comprise numerous improved structural and mechanical properties both as a single sheet of foam (prior to splitting) as well as after being split into two sheets of foam, for example.

Conventional methods of producing polyolefin foams include extruding a foamable sheet comprising thermoplastic resins, foaming agents and additives. Prior to foaming the foamable sheet in an oven at an activation temperature of the foaming agent, the foamable sheet may be crosslinked via irradiation by passing it through an electron beam irradiator, for example. As is practiced in the art, electron beam irradiators are configured to deliver a sufficient dose of electrons to each side of the foamable sheet such that the electrons pass all the way through the foamable sheet material and exit out the other side while providing an even level of crosslinking throughout the foamable sheet. As the electrons pass through the foamable sheet, they impart their energy to the material forming crosslinks between the polymer strands and thereby strengthen the bonds throughout the thickness of the foamable sheet.

For example, under conventional methods, a foamable sheet may be passed through an electron beam irradiator such that a first side is first exposed with irradiation. The irradiator is configured to deliver a sufficient does of electrons such that they travel from the first side and through the foamable sheet to exit from the opposing, second side, but the electrons lose some energy as they pass through and interact with the polymer material to crosslink it. This means that the level of crosslinking and therefore gel content will be high in a first side surface region and progressively diminish through the thickness of the foamable sheet to a second side surface region, producing a gradient of crosslinking. To compensate and create an even level of crosslinking and gel content throughout the whole thickness of the foamable sheet, the sheet is subsequently passed through the electron beam irradiator again, but such that the second side is exposed with the same level of irradiation, thereby balancing the dose through the thickness of the foam and achieving an even level of crosslinking throughout including in the intermediate region of the foamable sheet where the crosslinking levels overlap.

A foamable sheet irradiated according to such method, after being foamed in an oven, will have an even degree of crosslinking throughout the thickness of the material, including in both surface regions and an intermediate region therebetween, as well as a uniform cell size throughout. Conventionally, it is desirable to have uniform crosslinking throughout the foam as well as a uniform cell size, otherwise weaknesses may be formed within the foam that render it unsuitable for use in various applications, as well as abnormalities in other properties of the foam that may affect its performance.

Patent publication number US20030082364A1, however, discloses a foam material with variable crosslinking, wherein one side of the foam is intentionally dosed with a higher irradiation than the other side. Such a foam will have a first side region having a higher amount of crosslinking and smaller cell size, and a second side region having a lower amount of crosslinking and larger cell size. The reference discloses that the greater cross-linking on one side allows the material to be used in combination with a wider range of materials than is possible with foamed materials having uniform cross-linking. The references discloses that the foamed material with a varied amount of cross-linking can have either two distinct levels of cross-linking across the material or a gradient of cross-linking across the material, thus allowing control of a range of properties such as heat resistance during molding, allowing use of plastics with higher melt temperatures, improved compression set properties in the final product, and improved high temperature performance of the final product. Additionally, the reference discloses it is also possible to cross-link a second time after foaming through irradiation or the like. This allows the foam sheet to be produced with lower density without compromising the heat resistance required during the end-use process (such as low-pressure molding, insert molding, compression molding, etc.).

Although some useful variable cross-linking methods and benefits are disclosed in reference US20030082364A1, these only include producing foams having two regions of different crosslinking levels (e.g., high and low sides) and gradients (e.g., progressively high to low or low to high crosslinking levels from one side to another). In other words, only foams having two regions with two distinct gel contents, or foams having only a gradient of gel contents are envisioned. Notably, each of these examples produce a foam having asymmetrical levels of crosslinking, gel content and cell size from one side of the foam to the other.

Although these variably crosslinked foams and conventional foams (having uniform crosslinking) are known in the prior art, there is still a strong need for foams having additional properties not achievable under those methods alone.

As an example, some end-use applications require a single sheet of foam that can be split apart in a controlled, even manner, to produce two sheets of foam. When trying to split or tear apart a foam sheet produced by any of the prior art methods, the tear does not propagate consistently through a core or intermediate region of the foam, but rather surfaces on one side or the other resulting in only a portion or chunk of the foam being pulled apart. In the case of a double-sided foam tape, for example, when an adhered object is removed from a wall or other substrate surface, the entire foam sheet may end up being pulled off the wall surface, off the object surface, or more often, torn randomly such that uneven portions of the foam remain on both the wall and the object. In a worst-case scenario, portions of the substrate or object may also be damaged and pulled off.

Furthermore, for foams such as acoustic foams benefiting from an open cell surface structure, conventional methods of converting a single sheet of foam into two sheets of foam involve skiving the sheet with a blade, rather than physically pulling or tearing it apart, such as described in patent publication number EP0286571B1. The longitudinal cutting of the foam results in an even, open cell surface profile with little variation in thickness, for example, and is therefore typically favored in the industry. For example, in EP0286571B1, the reference teaches skiving a closed cell polyurethane foam panel to form two panels of identical dimension each having one surface of high density, small cell structure and each having one surface of low density, large cell structure, the large cell structure having been skived to create large open cells. However, even such skived foam does not always exhibit sufficient acoustic and other properties to satisfy industry demands, including but not limited to adhesive bonding, water retention, anti-slipping and others.

Other known methods of splitting a foam sheet structure involve laminating each side of the foam to a structural layer and then pulling it apart, as taught for example in patent publication GB738494A. In that reference, two sheets of pliable non-rubber material were bonded on either side of a layer of sponge rubber and split longitudinally through the thickness of the sponge rubber to produce two sheets of material, each having the pliable non-rubber backing sheet secured to one face of the sponge rubber layer, the exposed surface of which had superficial pores of larger dimensions than the pores within the thickness of the sponge rubber layer. However, it is not always desirable to incorporate a laminated backing layer on each pulled apart sheet of foam since this can affect the overall properties of the product, limit freedom of design and use, as well as require the additional processing steps and material costs.

Accordingly, there remains a need for an improved foam structure and methods of producing the same to address the many problems of the prior art. Such foam should have characteristics tailored and appropriate for the unique specifications of an application where the foam is used.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure relates to closed cell crosslinked polyolefin foam sheets, a process for splitting the closed cell crosslinked polyolefin sheets, and the split crosslinked polyolefin foam having a closed cell skin side and an open cell split side.

In one aspect, a closed cell crosslinked polyolefin foam sheet comprises an opposing first surface region and second surface region, and an intermediate region disposed therebetween, wherein a ratio of a gel content of the intermediate region versus an average gel content of the first surface region and the second surface region is about 75% or less, and wherein a ratio of the average cell size of the intermediate region versus an average cell size of the first surface region and the second surface region is about 125% or higher.

In another aspect a closed cell crosslinked polyolefin foam sheet comprises an opposing first surface region and second surface region, and an intermediate region disposed therebetween, wherein the intermediate region is configured to have a gel content lower than an average gel content of the first surface region and the second surface region to enable a controlled tear propagation within the intermediate region when a splitting force is applied to the closed cell crosslinked polyolefin foam sheet.

In another aspect a process for producing split crosslinked polyolefin foam sheets comprises producing a crosslinked polyolefin foam sheet having an opposing first surface region and second surface region, and an intermediate region disposed therebetween, wherein the intermediate region is configured to have a gel content lower than an average gel content of the first surface region and the second surface region, and an average cell size larger than an average cell size of the first surface region and the second surface region; and applying a splitting force to the crosslinked foam sheet such that a controlled tear propagation travels through the intermediate region until a first side of the crosslinked polyolefin foam sheet and a second side of the crosslinked polyolefin foam sheet are separated to produce two split polyolefin foam sheets.

In another aspect, a split crosslinked polyolefin foam sheet comprises a skin side comprising a closed cell surface; and a split side comprising an open cell surface having peak heights of about 150 μm to about 550 μm.

BRIEF DESCRIPTION OF THE DRAWINGS

FIGS. 5A and 5B are schematic side views of the foam sheet of FIGS. 2-3 during splitting and after being split apart, respectively.

FIG. 6 is a schematic view of an example production splitting process for the foam sheet of FIGS. 2-3 according to the present disclosure.

DETAILED DESCRIPTION

Disclosed herein is an improved polyolefin foam composition and method of producing the same, wherein the foam comprises numerous improved structural and mechanical properties both as a single sheet of foam, as well as after being split into two sheets of foam, for example. In one non-limiting example, the foam comprises an intermediate region configured to allow controlled split tear propagation when a threshold splitting force is applied, such that a first side and second side of the foam split apart from one another in a consistent and even manner through only the intermediate region, and without undesired tears in the foam outside of that region. Further disclosed is a manufacturing process for splitting the foam without the need for skiving.

Figure 1:
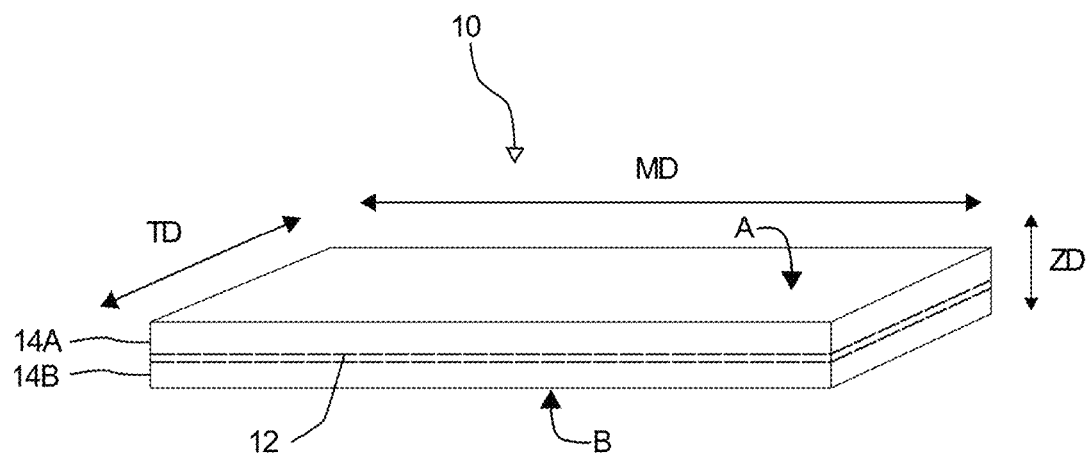
FIG. 1 is a schematic perspective view of a foamable sheet according to the present disclosure.

FIG. 1 is a perspective view of a foamable sheet 10, having a first side A, a second side B, an intermediate region 12 between sides A and B, as well as surface region 14A between intermediate region 12 and side A, and surface region 14B between intermediate region 12 and side B. Further represented are the machine direction MD (i.e. length dimension), the transverse direction TD (i.e. width dimension), and Z direction ZD (i.e. thickness dimension) of the foamable sheet 10, in reference to the direction of extrusion of the sheet. The foamable sheet may be made according to various processes common in the art, including extrusion, and may include one or more resins, a foaming agent, and suitable additives.

Polymers or resins suitable for use in the foamable sheet include but are not limited to low density polyethylene (LDPE), linear low density polyethylene (LLDPE); medium density polyethylene (MDPE); high density polyethylene (HDPE); ethylene vinyl acetate (EVA); polypropylene (PP); ethylene propylene diene monomer (EPDM), thermoplastic olefin (TPO), thermoplastic elastomer (TPE), and rubber. Individual resins may be selected for the foamable sheet, as well as blends of two or more resins. Suitable foaming agents may include azodicarbonamide (ADCA), for example.

In contrast with conventional methods for irradiating foamable sheets, a novel controlled depth crosslinking technique is utilized according to the present disclosure, such that each side A and B of foamable sheet 10 is irradiated at a lower energy configured based on the material and effective thickness of foamable sheet 10. In such case, the electrons entering each side in opposite directions penetrate a thickness of the foamable sheet that overlaps in the intermediate region 12 before losing energy and stopping their travel within the foamable sheet, rather than exiting the other side surface. The slowing down and eventual extinction of high energy electrons after travelling a certain distance through a material may be referred to as the practical range of those electrons. Adjusting the practical range of electrons penetrating the foamable sheet 10 from each side, in turn, such that they travel through a minimal or controlled width overlapping area within the intermediate region 12 before losing energy, results in a defined intermediate region 12 of foamable sheet 10 configured to have a lower degree of crosslinking relative to another region of the foamable sheet 10, such as surface regions 14A and 14B. Further, the position and characteristics of the intermediate region 12, including its gel content, location and width, can by tightly controlled through adjusting variables such as material type, effective thickness, voltage potential, dose, line speed, and beam width.

For example, to determine optimal irradiation conditions, electron beam irradiators can be adjusted to change their voltage potential (kV) and current (mA) to affect the amount of dose (Mrads), for example, based on the effective thickness (ET) of the foamable sheet 10 and its material type. ET is calculated by the actual thickness of the foamable sheet (mils), multiplied by the density of the material (g/cm$^3$). Other variables that may be adjusted according to ordinary skill in the art are line speed (m/min) of the foamable sheet 10 traveling through the electron beam irradiation machine, and the scan beam width (in) of electrons. For example, if line speed is increased, then dose (Mrad) can be kept constant while the current (mA) must be adjusted accordingly.

Figure 2:
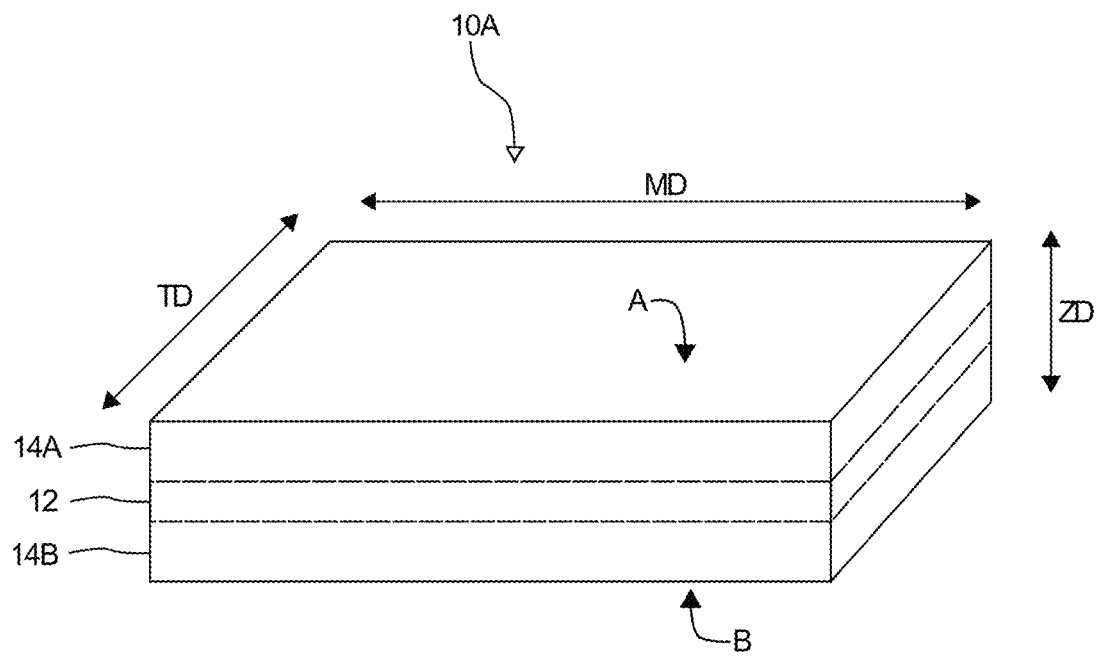
FIG. 2 is a schematic perspective view of a foam sheet after foaming the foamable sheet of FIG. 1.

With reference to FIG. 2, after the foamable sheet 10 has been irradiated using the novel controlled depth crosslinking technique described above, such that intermediate region 12 of foamable sheet 10 has a lower degree of crosslinking relative to surface regions 14A and 14B, the foamable sheet 10 can then be foamed at or above an activation temperature of the foaming agent. During the foaming process, foamable sheet 10 will expand in each direction TD, MD and Z to produce foam 10A (e.g., a foamed sheet). Foam 10A will have a resulting gel content in the intermediate region 12 that is lower than the gel content of regions 14A and 14B, and will furthermore have a symmetrical cell size structure, with larger cells in the intermediate region 12 and proportionally smaller cells in the surface regions 14A and 14B, as described in more detail below. Importantly, this structure is achieved within the single sheet of foam 10A, and does not require lamination or co-extrusion of other foams or other post-processing steps.

Figure 3:
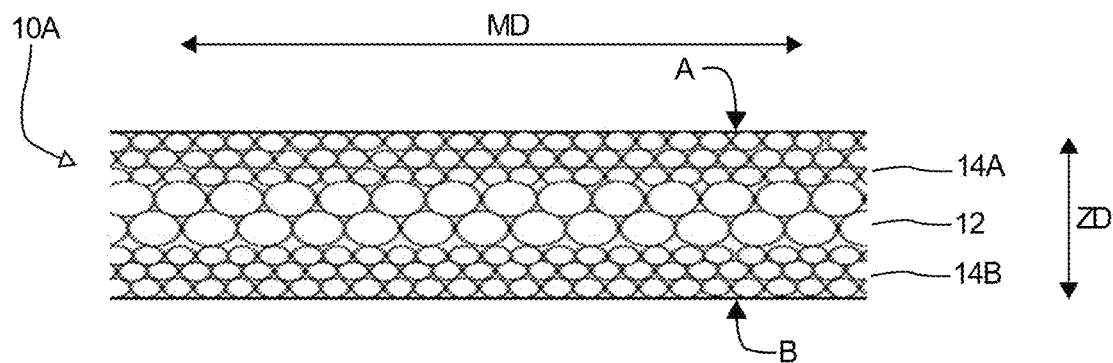
FIG. 3 is a schematic side cross-sectional view of the foam sheet of FIG. 2.

FIG. 3 is a cross section of foam 10A of FIG. 2, showing that a larger cell structure in intermediate region 12 has resulted after foaming due to the lower degree of crosslinking (and lower gel content) in that region after utilizing the novel controlled depth crosslinking method. Cell formation may be influenced, for example, by the degree of crosslinking in the polymers around the foaming agent in the material, thereby restricting the expansion of gas from the foaming agent during the foaming process. If the degree of crosslinking is even throughout the foamable sheet, as well as the activation of foaming agent during the foaming process, then cells will normally expand to reach a similar restricted size throughout the material in relation to the degree of crosslinking. However, when using controlled depth crosslinking as described herein, the gel content and cell size of the intermediate region 12 of foam 10A can be tightly controlled and configured for certain specifications versus surface regions 14A and 14B, including desired performance properties. These specifications and desired properties can not only be controlled for the single sheet of foam 10A, but also with respect to each sheet of foam produced after the foam has been split through controlled tear propagation, which is also enabled by the present methods.

For example, with respect to the single sheet of foam 10A produced by the methods described herein, the foam may have a gel ratio configured to be between about 90% or less, preferably about 75% or less, more preferably about 50% or less. Gel ratio is calculated by comparing the gel content of the intermediate region 12 to the total average gel content of surface regions 14A and 14B, as further described in Example 1 of the present disclosure. Alternatively, the gel ratio may be between about 15% to about 90%, preferably between about 15% to about 75%, more preferably about 15% to about 50%. When lower than about 15%, the foam begins to exhibit blistering due to cell walls breaking down to form larger blister cells.

The thickness of the intermediate region 12 may also be adjusted to suit the needs of the foam application, but generally is between about ⅓ to about ⅔ of the overall foam thickness.

The cell size ratio of the single sheet of foam 10A produced by the methods herein may be calculated as the difference in cell sizes between the intermediate region 12 divided by the total average of the surface regions 14A and 14B, as further described in Example 2 of the present disclosure. The cell size ratio may be configured to be about 125% or higher, preferably about 200% to about 400%, more preferably about 250% to about 400%.

Suitable densities of foams produced according to the methods of the present disclosure may be between about 1.5 pcf to about 20 pcf, preferably about 1.5 pcf to about 15 pcf, more preferably about 2 pcf to about 10 pcf.

Further, by configuring the gel ratio and cell size ratio as described, among other features, the foam 10A may be tailored to have desirable properties suitable for a wide range of applications. For example, foams produced according to the methods of the present disclosure may have a 50% compression set of under about 10%, preferably about 3% to about 10%, more preferably about 4% to about 9%, which is not achievable with standard irradiated foams.

Foam 10A produced by the methods of the present disclosure may also be configured to have improved dent depth recovery versus standard foams, including recovery improvements of about 55% to about 80% versus the standard foams, as well as improvements of about 35% to about 65% versus standard foams even after post-crosslinking the foam to improve its heat resistance, as described in more detail with reference to Example 7 of the present disclosure. Foam 10A may, for example, have a dent depth of about 35% to about 45% of the original thickness at zero hours and about 4% to about 6% of the original thickness after 168 hours according to test standard VDA237-101-2. Further, foam 10A may have dent depth recovery of about 50% to about 55% of the original thickness at zero hours and about 5% to about 10% of the original thickness after 168 hours according to test standard VDA237-101-2 after the polyolefin foam sheet has been post-crosslinked to have a gel content in the intermediate region of about 50% or higher.

In another example, the lower degree of crosslinking or gel content in intermediate region 12 may be configured relative to surface regions 14A and 14B based on the irradiation and foamable sheet 10 conditions to enable a controlled split tear propagation along the intermediate region 12 of foam 10A when a threshold splitting force is applied to the foam sheet 10A. The threshold splitting force may be determined based on the needs of the end-use application, for example, adjusting the degree of crosslinking such that it is sufficiently high enough to satisfy the holding strength of a foam tape application, while also being sufficiently low enough to enable the controlled, even split tear propagation along and within the bounds of intermediate region 12 and without damaging any substrate or object adhered to the foam 10A.

Figure 4:
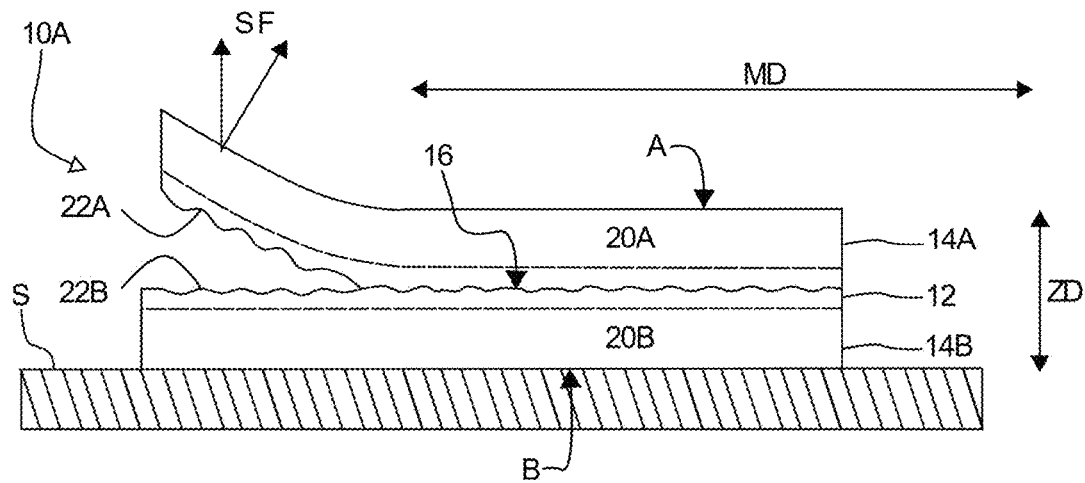
FIG. 4 is a schematic side view of the foam sheet of FIGS. 2-3 adhered to a substrate on one side and being split apart.

FIG. 4 shows an example of foam sheet 10A adhered on side B to substrate S, while a splitting force SF is represented by a few example vectors pulling on side A either in the Z direction or at some acute angle relative thereto. After intermediate region 12 has been split apart, new open cell surfaces 22A and 22B arise, with open cell surface 22A being opposite closed cell surface A, and open cell surface 22B being opposite closed cell surface B.

Further shown is split tear propagation line 16, which stays within intermediate region 12 in a controlled manner during splitting of foam 10A, thereby allowing side A of foam 10A to be evenly peeled away from side B when a threshold splitting force SF is applied, such as by a user, ultimately producing two separate foam sheets from halves 20A and 20B. As described above, the relative degree of crosslinking of surface regions 14A and 14B and intermediate region 12 may be configured and tailored to meet the specific needs of an application, for example, to avoid damaging substrate S when an object bound to side A is pulled away at a threshold splitting force PF. In contrast, a foam produced from a foamable sheet 10 according to the prior art methods, when split lengthwise (MD) or across (TD) by applying a splitting force in the Z direction (ZD), for example, will not generate an even split tear propagation through the material. Rather, the tear 16 will propagate randomly through the material, outside of intermediate region 12, and may surface at either side A or B of foam 10A, at which point a chunk of the foam may tear off before the whole side has been peeled away. This is particularly troublesome for some foam tape applications where it is desired to evenly split one side of the foam away from the other, or methods where it is desirable to continuously peel side A away from side B to produce two foam sheets from one foam sheet.

FIG. 5A shows a similar concept of splitting foam 10A as shown in FIG. 4, except wherein neither side of foam 10A is anchored to a substrate, such that foam 10A may be pulled apart by two separate opposing splitting forces SF to produce two separate foams 20A' and 20B'. After intermediate region 12 has been split apart, new open cell surfaces 22A and 22B arise, with open cell surface 22A being opposite closed cell surface A in foam 20A', and open cell surface 22B being opposite closed cell surface B in foam 20B'.

Splitting force strength of foam 10A is measured as described in Example 4 of the present disclosure according to the splitting force strength test method, and may be configured to be between about 5 lbf to about 35 lbf, preferably about 8 lbf to about 33 lbf, more preferably about 9 lbf to about 30 lbf. The splitting force strength of foams of the present disclosure may be significantly reduced in comparison to standard foams having comparable densities, the reduction being between about 25% to about 80%, preferably between about 30% to about 70%, more preferably between about 40% to about 60%.

T peel strength of foam 10A is measured as described in Example 5 of the present disclosure according to the T peel strength test method and may be configured to be between about 1 lbf to about 5 lbf, preferably about 1.5 lbf to about 4 lbf, more preferably about 1.6 lbf to about 3.1 lbf. The T peel strength of foams of the present disclosure may be significantly reduced in comparison to standard foams having comparable densities, the reduction being between about 20% to about 70%, preferably about 30% to about 60%, more preferably about 40% to about 50%.

FIG. 6 is a schematic diagram of manufacturing process 100 showing an example of how the foam 10A according to the present disclosure may be continuously split. Feed roll F containing foam 10A may be fed to pairs of nip rollers N1, N2 rotating in opposite directions, such as N1 in a counter-clockwise and N2 in a clockwise direction as shown. By rotating in opposing directions, a splitting force SF such as shown in FIG. 5A can be achieved mechanically from both sides A and B of foam 10A, thereby yielding two sheets of foam 20A' and 20B' that can be guided with the aid of guide rollers as needed and finally wound up by winding machines W1 and W2. According to this method, there is no need to utilize or maintain any skiving equipment, since the foam 10A can be split in half using only the nip rollers N1, N2. Further, the rate at which the foam 10A may be split is sufficiently fast to enable it to be part of an in-line manufacturing process with the foam production itself.

The controlled split tear propagation enabled by the present disclosure is so effective, it may be tailored to produce two split foams 20A' and 20B' each having an average gauge of about 30% to about 70% of the original full gauge of the unsplit foam 10A, preferably about 40% to about 60%, more preferably about 45% to about 55%. Further, split foams 20A' and 20B' may also each have a mass of about 30% to about 70% of the original full mass of the unsplit foam 10A, preferably about 40% to about 60%, more preferably about 45% to about 55%. Split foams 20A' and 20B' may also each have a density of about 75% to about 125% of the original full density of the unsplit foam 10A, preferably about 85% to about 115%, more preferably about 90% to about 110%, as described further in Example 8 of the present disclosure.

Further, if even, symmetrical halves are desired, the method of the present disclosure may yield maximum variances of about 20% for gauge (from and ideal of 50%), about 10% for mass (from an ideal of 50%), and about 16% for density (from an ideal of 100%), as described further in Example 8 of the present disclosure. The method of the present disclosure may also yield maximum average variances of only about 5% for gauge (from and ideal of 50%), about 2% for mass (from an ideal of 50%), and about 6% for density (from an ideal of 100%), as described further in Example 8 of the present disclosure.

After splitting, the foams 20A' and 20B' may also be configured for numerous desirable properties. For example, in addition to the gel content, cell size and open cell structures that may be created on surfaces 22A and 22B, foams 20A' and 20B' may also comprise advantageous physical characteristics that provide for additional performance advantages as described herein. For example, peak heights of surfaces 22A and 22B may range from about 150 μm to about 550 μm, preferably from about 200 μm to about 500 μm, and may comprise about a 12 fold increase in peak heights compared with standard foam skin (closed cell surface), and about a 4 fold increase compared with a standard foam skived surface (open cell surface), as described further in Example 9 of the present disclosure. Surface roughness (Sa) of surfaces 22A and 22B may range from about 70 μm to about 150 μm, preferably between about 75 μm to about 140 μm, more preferably between about 80 μm to about 135 um, and may comprise about a 6 fold increase in surface roughness compared with standard foam skin (closed cell surface), and about a 1.8 fold increase compared with a standard foam skived surface (open cell surface), as described further in Example 10 of the present disclosure.

The split foams 20A' and 20B' may also be configured such that the coefficient of friction (COF) between surfaces 22A and 22B ranges between about 1.0 lbf to about 4.5 lbf, preferably about 1.5 lbf to about 4.0 lbf, more preferably about 1.8 lbf to about 3.5 lbf for static COF, and for kinetic COF, between about 1.0 lbf to about 4.0 lbf, preferably about 1.5 lbf to about 3.5 lbf, more preferably about 1.5 lbf to about 3.0 lbf. For static COF, this may comprise about a 4.1 fold increase compared with standard foam skin (closed cell surface), and about a 3.3 fold increase compared with a standard foam skived surface (open cell surface); and for kinetic COF, may comprise about a 4.4 fold increase compared with standard foam skin (closed cell surface), and about a 3.7 fold increase compared with a standard foam skived surface (open cell surface), as described further in Example 11 of the present disclosure.

The split foams 20A' and 20B' may also be configured such that the average sound reduction achieved by surfaces 22A and 22B ranges between about 5 dB to about 25 dB, preferably about 5 dB to about 20 dB, more preferably about 8 dB to about 17 dB according to the transmittance acoustic test method described in Example 12 of the present disclosure. Split foams surfaces 22A and 22B according to the present disclosure will perform better than any standard foam skin surface of comparable basis weight, and better than any standard foam skived surface for basis weights of about 7 g/sqft or above.

The split foams 20A' and 20B' may also be configured such that the surface water retention of surfaces 22A and 22B ranges between about 0.010 grams to about 0.050 grams, preferably about 0.015 grams to about 0.045 grams, more preferably about 0.017 grams to about 0.043 grams according to the surface water retention test method described further in Example 13 of the present disclosure, and may comprise about a 3.9 fold improvement compared with a standard foam skin surface, and about a 1.5 fold improvement compared with a standard foam skived surface.

The split foams 20A' and 20B' may also exhibit superior adhesive properties on surfaces 22A and 22B, having better adhesive anchorage than a standard foam skived surface, and comparable performance to a standard foam skin surface. For example, the skin peel strength of the split foam surface may be about 0.95 N/mm or greater, preferably about 1.00 N/mm or greater, more preferably about 1.10 N/mm or greater, according to the adhesive test method and results described further in Example 14 of the present disclosure.

EXPERIMENTAL METHOD

The following formulations of TABLE 1 were used to prepare foamable sheets and foams for the experiments and examples described further below.

TABLE 1

| Raw Material Type | EVA (phr) | PE (phr) | PP (phr) |
|---|---|---|---|
| LDPE |  | 100 |  |
| Lubricant |  | 1.2 |  |
| Sulfer Based AO |  | 0.17 |  |
| Lubricant |  | 0.5 |  |
| Catalyst |  | 0.23 |  |
| Foaming Agent |  | AR |  |
| EVA | 100 |  |  |
| Lubricant | 0.8 |  |  |
| Sulfer Based AO | 0.17 |  |  |
| Catalyst | 1.2 |  |  |
| Foaming Agent | AR |  |  |
| LLDPE |  |  | 20.0 |
| Cataloy PP |  |  | 25.0 |
| h-PP |  |  | 35.0 |
| TPE |  |  | 20.0 |
| crosslinking promoter |  |  | 3.5 |
| Phenol Based AO |  |  | 1.0 |
| Heat Stabilizer |  |  | 0.5 |
| Sulfer Based AO |  |  | 0.5 |
| Foaming Agent |  |  | AR |

Wherein EVA is ethylene-vinyl-acetate, PE is polyethylene, PP is polypropylene, LDPE is low-density polyethylene, LLDPE is linear low-density polyethylene, AO is antioxidant, h-PP is a homopolymer of PP, TPE is a thermoplastic elastomer, and AR denotes "as required" to achieve the target density of the foam as is known in the art.

Foamable sheet samples of were produced based on the formulations of TABLE 1 and crosslinked according to standard methods to produce control samples having even crosslinking throughout, as well as according to the novel controlled depth crosslinking methods of the present disclosure to have less crosslinking in their intermediate (i.e. their "core") region versus their surface regions and to varying degrees. The foamable sheets were then foamed at an activation temperature of the foaming agent to produce foam samples having varying densities for testing according to the procedures below.

Example 1—Gel Ratio

Gel content of the intermediate region 12 or "core" region, surface A (surface region 14A) and surface B (surface region 14B) was measured for each irradiated sample of foam produced according to the experimental method above. Using a sharp razor and shims, each foam sample and control was skived into three layers of equal thicknesses, to separate outside (A-side), intermediate region/core, and outside (B-side) specimens. The crosslinking level of the skived foam samples and controls was determined by preparing a 12 mm wide sample with 3 even slits inside, making four 3 mm wide strips, then cutting at an appropriate length such that the weight of the sample was between 0.047 g and 0.053 g. The weighed crosslinked polyolefin foam (A in grams) was then immersed in 25 mL of xylene at 120° C. for 24 hours. After 24 hours, the content was filtered through a 200-mesh wire mesh and left sitting inside a fume hood for a minimum of 12 hours. Subsequently, the sample was placed in a 100° C. vacuum oven set at 15 inHG for 4 hours along with the wire mesh to vacuum-dry the insolubles on the wire mesh. The dry weight (B in grams) of the insolubles was measured and the crosslinking level was calculated from the following equation: Crosslinking level (% by weight)=100×(B/A).

A-side and B-side results were averaged to generate an outside gel content value, and then the measured gel content value of the core region was divided by the averaged outside gel content value to create a ratio of core to outside. The results are shown in TABLES 2A, 2B, and 2C below, and corresponding FIGS. 7A, 7B, and 7C, respectively.

TABLE 2C

| PP Foam | | Sample 1 | Control 1 | Control 2 |
|---|---|---|---|---|
| Density(pcf) | | 2.6 | 2.1 | 4.2 |
| Gel (%) | A-side | 44.4 | 51.3 | 41.1 |
| | Core | 27 | 47.9 | 42.4 |
| | B-side | 41.3 | 47.1 | 44.8 |
| Ratio | | 63.0% | 97.4% | 98.7% |

Figure 7A:
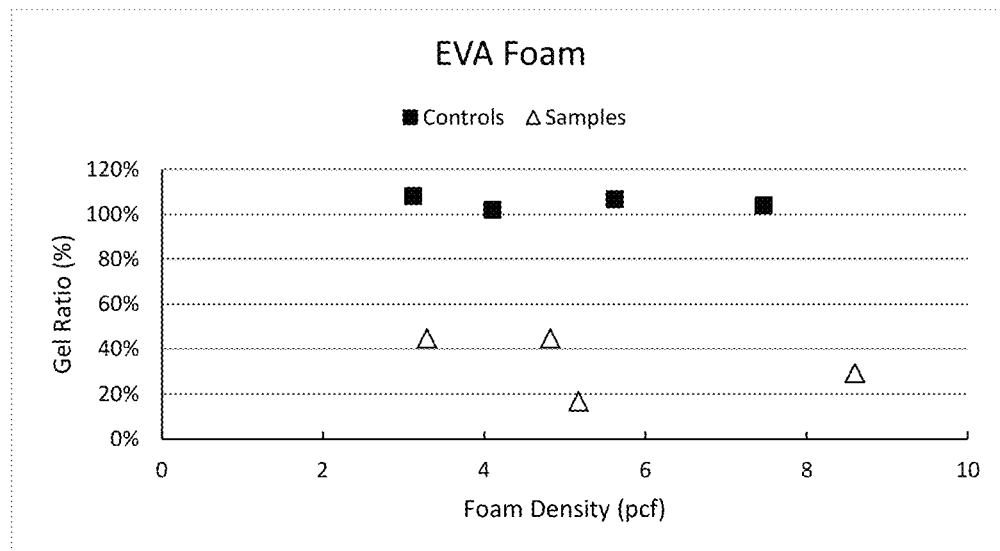
FIGS. 7A-7C are graphs of gel ratio versus foam density for foam sheets of the present disclosure.
Figure 7B:
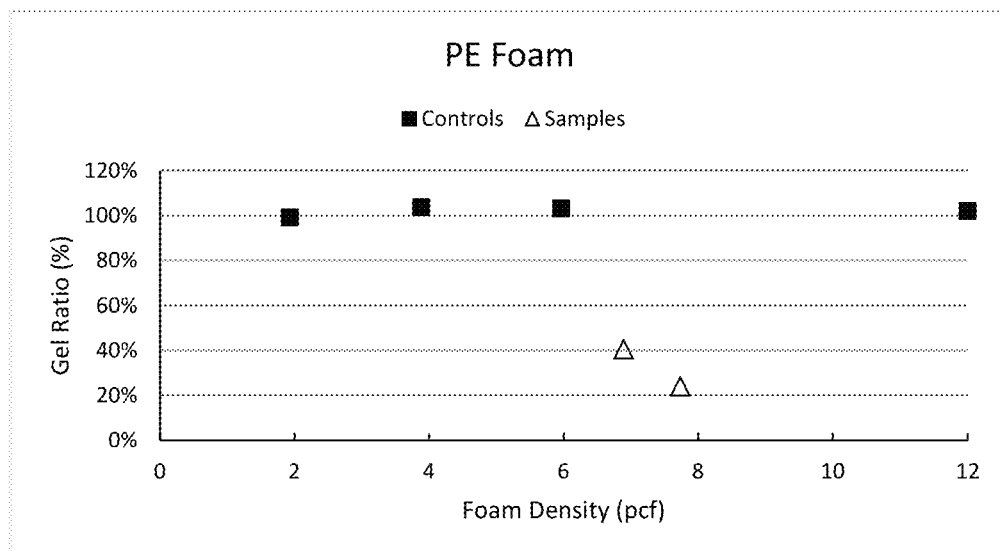
Figure 7C:
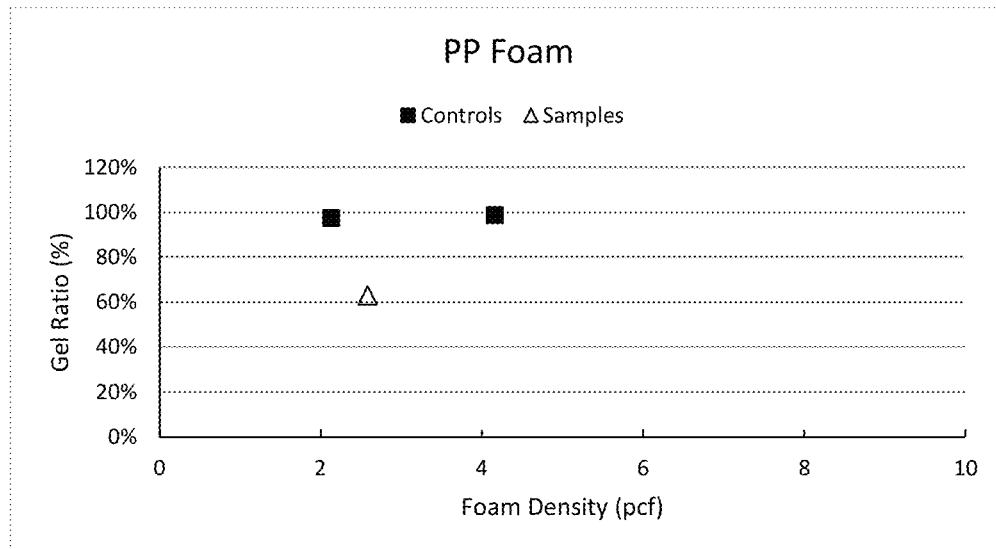

As shown in FIGS. 7A, 7B and 7C, the gel ratio for the control samples all hovered around 100%, indicating an even level of crosslinking and gel content throughout the samples. However, the gel ratio for the controlled depth crosslinking samples were all consistently much lower than the controls. These gel % ratios were achieved from about 15% to about 65% according to the methods of the present disclosure.

Example 2—Cell Size Ratio

Cell sizes of the intermediate region 12 or "core" region, versus surface A (surface region 14A) and surface B (surface region 14B) were measured for each irradiated sample of foam produced according to the experimental method above. A perpendicular cut to the foam was made using a sharp razor blade to make sure the sliced surface was pristine. Using a microscope (Keyance 3D microscope VHX-6000) with measurement capability, cross-sections were observed from each region of foam. In particular, five cells were selected from the A-side and five cells from the B-side, close to the surface, and then cell sizes were measured in the z-direction, with the average cell sizes determined. Further, ten cells from the core region were selected and measured in the z-direction, and the average determined. Finally, the difference in cell sizes between the core region and surface regions were compared and expressed as a ratio (core divided by total average of outside regions). The results are shown in TABLES 3A, 3B, and 3C below, and corresponding FIGS. 8A, 8B, and 8C, respectively.

TABLE 2A

| EVA Foam | | Sample 1 | Sample 2 | Sample 3 | Sample 4 | Control 1 | Control 2 | Control 3 | Control 4 |
|---|---|---|---|---|---|---|---|---|---|
| Density (pcf) | | 3.3 | 4.8 | 5.2 | 8.6 | 3.1 | 4.1 | 5.6 | 7.5 |
| Gel (%) | A-side | 35.1 | 32.3 | 27.5 | 26.1 | 48.7 | 41.3 | 50.6 | 53.1 |
| | Core | 16.4 | 13.7 | 4.8 | 7.5 | 52.3 | 39.9 | 53.9 | 53.7 |
| | B-side | 38.1 | 28.9 | 30.1 | 25.1 | 48.1 | 36.9 | 50.4 | 50.2 |
| Ratio | | 45% | 45% | 17% | 29% | 108% | 102% | 107% | 104% |

TABLE 2B

| PE Foam | | Sample 1 | Sample 2 | Control 1 | Control 2 | Control 3 | Control 4 |
|---|---|---|---|---|---|---|---|
| Density (pcf) | | 6.9 | 7.7 | 1.9 | 3.9 | 6.0 | 12.0 |
| Gel (%) | A-side | 23 | 15 | 48 | 41.5 | 37.6 | 43.4 |
| | Core | 10.2 | 4.6 | 47 | 44.4 | 37.9 | 44.1 |
| | B-side | 27.2 | 23.1 | 47 | 43.9 | 35.7 | 42.90 |
| Ratio | | 40.6% | 24.1% | 99.4% | 104.0% | 103.4% | 102.2% |

TABLE 3A

| EVA Foam | | Sample 1 | Sample 2 | Sample 3 | Sample 4 | Control 1 | Control 2 | Control 3 | Control 4 |
|---|---|---|---|---|---|---|---|---|---|
| Density (pcf) | | 3.3 | 4.8 | 5.2 | 8.6 | 3.1 | 4.1 | 5.6 | 7.5 |
| Cell Size (μm) | Core | 1071.9 | 734.0 | 1242.9 | 1077.3 | 271.9 | 260.7 | 295.8 | 333.3 |
| | Outside | 399.2 | 328.9 | 342.5 | 299.4 | 261.7 | 263.1 | 276.8 | 275.4 |
| Ratio (Core:Outside) | | 269% | 223% | 363% | 360% | 104% | 99% | 107% | 121% |

TABLE 3B

| PE Foam | | Sample 1 | Sample 2 | Control 1 | Control 2 | Control 3 | Control 4 |
|---|---|---|---|---|---|---|---|
| Density (pcf) | | 6.9 | 7.7 | 1.9 | 3.9 | 6.0 | 12.0 |
| Cell Size (μm) | Core | 516.2 | 618.6 | 354.2 | 253.1 | 335.7 | 307.0 |
| | Outside | 203.1 | 239.9 | 329.4 | 295.1 | 331.1 | 283.0 |
| Ratio (Core:Outside) | | 254% | 258% | 108% | 86% | 101% | 108% |

TABLE 3C

| PP Foam | | Sample 1 | Control 1 | Control 2 |
|---|---|---|---|---|
| Density (pcf) | | 2.6 | 2.1 | 4.2 |
| Cell Size (μm) | Core | 692.4 | 598.3 | 347.3 |
| | Outside | 309.7 | 552.5 | 312.1 |
| Ratio (Core:Outside) | | 224% | 108% | 111% |

Figure 8A:
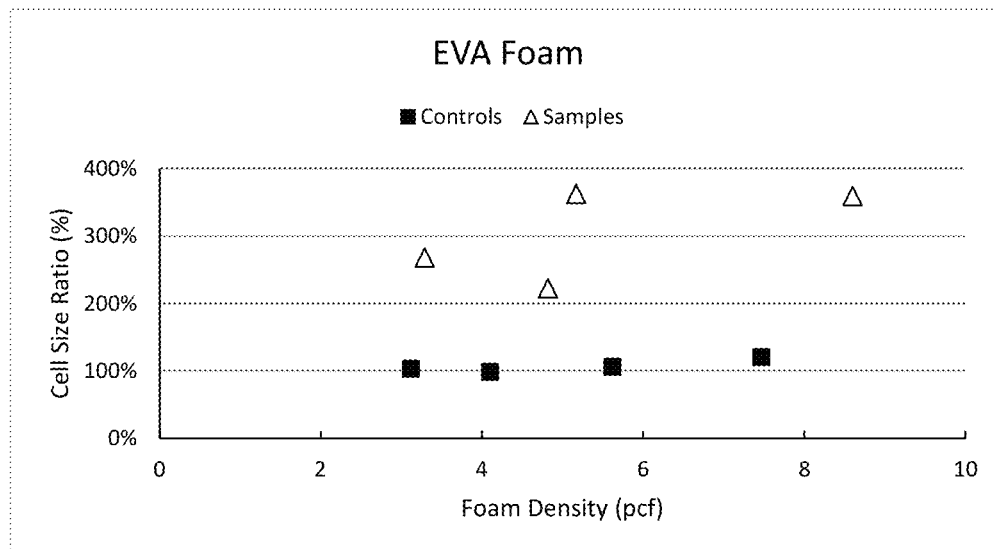
FIGS. 8A-8C are graphs of cell size ratio versus foam density for foam sheets of the present disclosure.
Figure 8B:
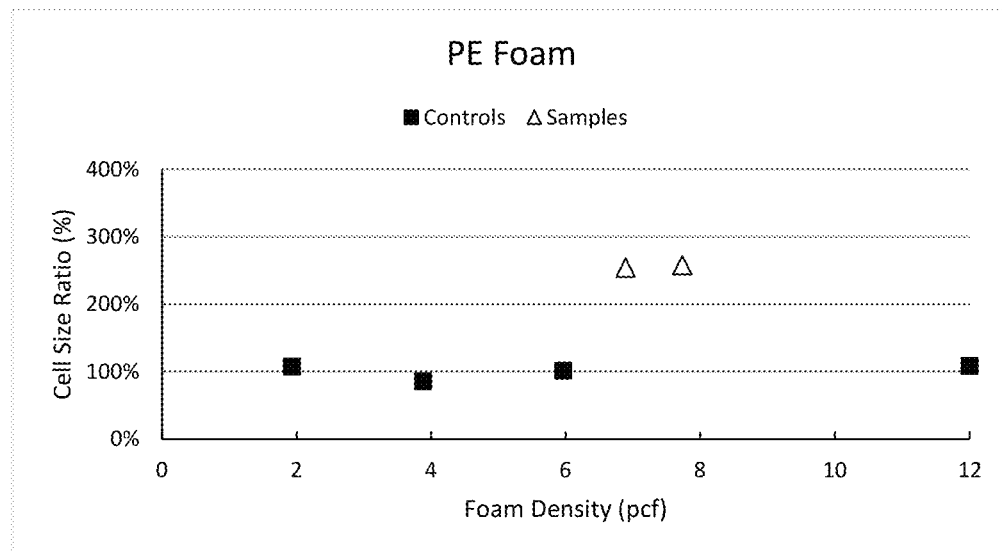
Figure 8C:
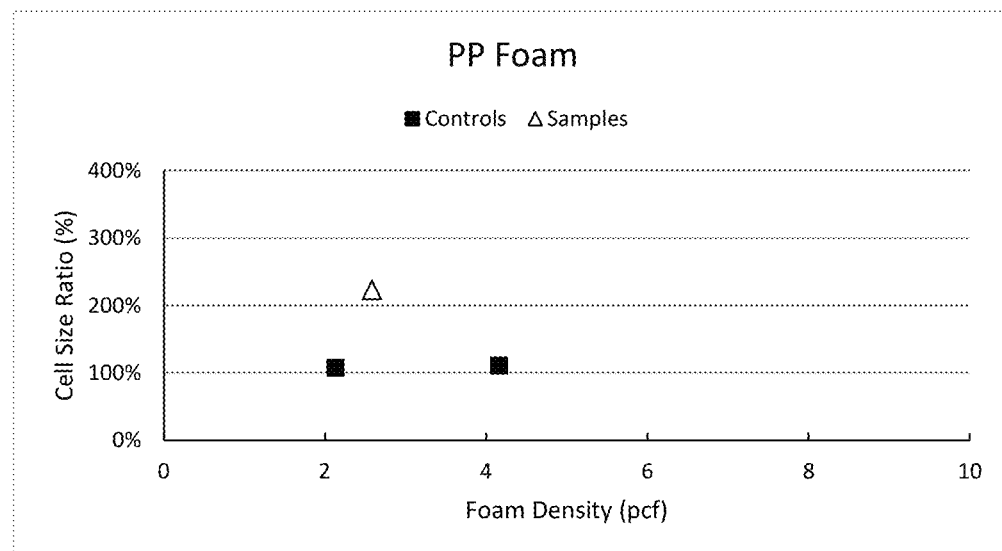

As shown in FIGS. 8A, 8B and 8C, the cell size ratio for the control samples all hovered around 100%, indicating an even level of cell size throughout the samples. However, the cell size ratios for the controlled depth crosslinking samples were all consistently much higher than the controls, meaning the cell size in the cores was much larger than the cell size in the surface regions. These cell size ratios were achieved from about 220% to about 365% according to the methods of the present disclosure.

Example 3—50% Compression Set

50% compression set was measured according to ASTM D3575 for each irradiated sample of foam produced according to the experimental method above. The results are shown in TABLES 4A, 4B, and 4C below, and corresponding FIGS. 9A, 9B, and 9C, respectively.

TABLE 4A

| EVA Foam | Sample 1 | Sample 2 | Sample 3 | Sample 4 | Control 1 | Control 2 | Control 3 | Control 4 |
|---|---|---|---|---|---|---|---|---|
| Density (pcf) | 3.3 | 4.8 | 5.2 | 8.6 | 3.1 | 4.1 | 5.6 | 7.5 |
| 50% Comp. Set (%) | 8.6 | 3.8 | 4.1 | 5.5 | 19.2 | 22.1 | 11.3 | 14.7 |
| avg | 8.6 | 3.8 | 4.1 | 5.5 | 19.2 | 22.1 | 11.3 | 14.7 |

TABLE 4B

| PE Foam | Sample 1 | Sample 2 | Control 1 | Control 2 | Control 3 | Control 4 | Control 5 |
|---|---|---|---|---|---|---|---|
| Density (pcf) | 6.9 | 7.7 | 1.9 | 3.9 | 6.0 | 7.0 | 12.0 |
| 50% Comp. Set (%) | 5.9 | 7.4 | 33.4 | 22.7 | 15.6 | 14.3 | 12.0 |
| avg | 5.9 | 7.4 | 33.4 | 22.7 | 15.6 | 14.3 | 12.0 |

TABLE 4C

| PP Foam | Sample 1 | Sample 2 | Sample 3 | Control 1 | Control 2 |
|---|---|---|---|---|---|
| Density (pcf) | 2.6 | 2.8 | 2.4 | 2.1 | 4.2 |
| 50% Comp. Set (%) | 34.6 | 32.7 | 30 | 34.6 | 22.72 |
| avg | 34.6 | 32.7 | 30.0 | 34.6 | 22.7 |

Figure 9A:
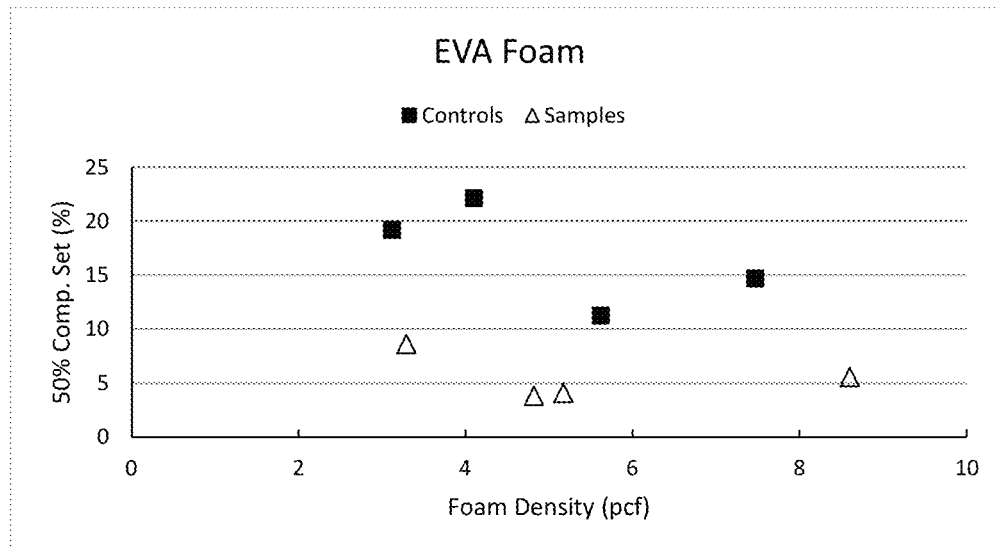
FIGS. 9A-9C are graphs of 50% compression set versus foam density for foam sheets of the present disclosure.
Figure 9B:
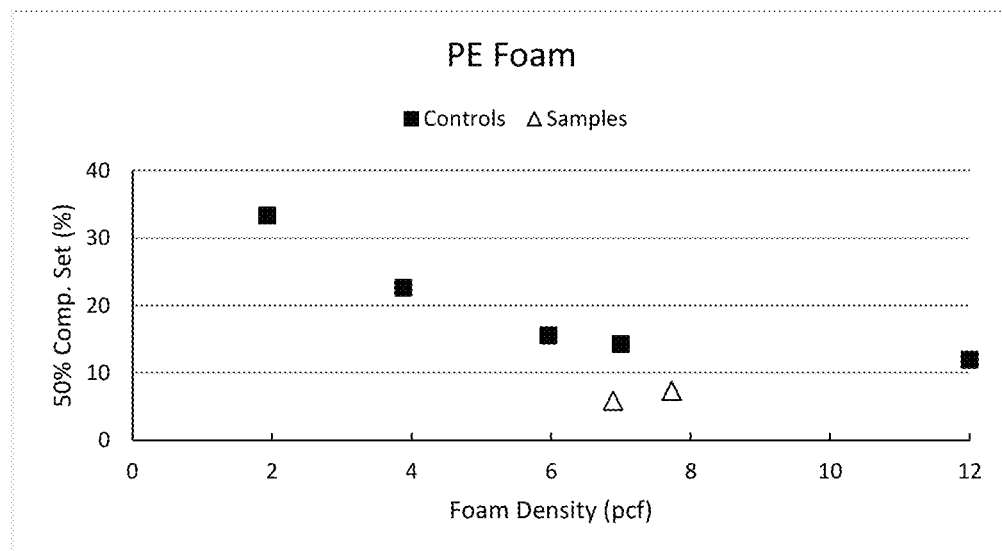
Figure 9C:
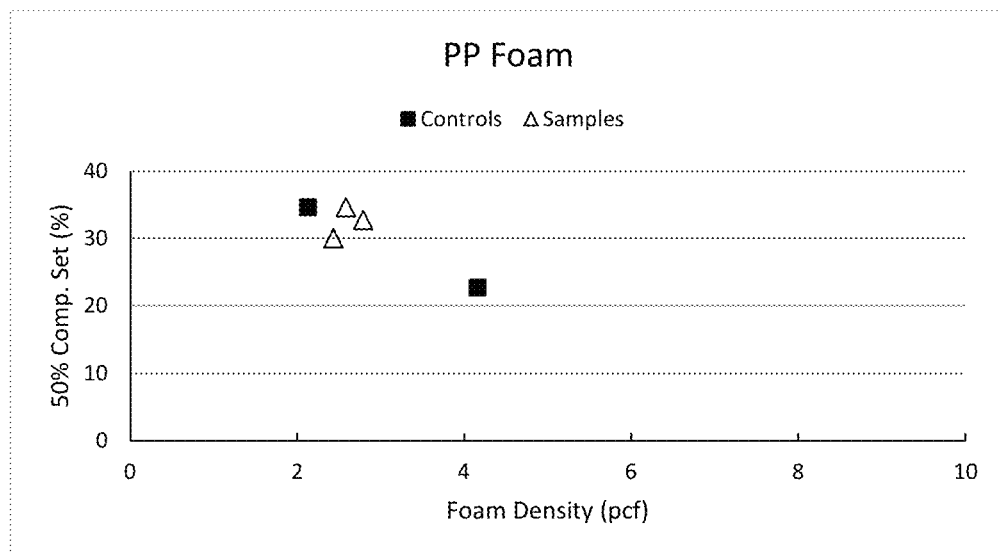

As shown in FIGS. 9A, 9B, the 50% compression set was improved (lowered) for all the samples versus the standard control foams. As shown in FIG. 9C, the 50% compression set was at least as good or comparable to standard PP foams, such that performance was not sacrificed.

Further, for each PE and EVA sample (shown in TABLES 4A and 4B), a 50% compression set was calculated for each control sample of a same density based on the trend data from FIGS. 9A and 9B respectively and compared in TABLE 4D below. As shown, 50% compression set was reduced (improved) in each PE and EVA sample compared with the controls of a given density, the % reduction ranging from about 45% to about 75%.

TABLE 4D

| 50% Comp. Set Comparison | Sample (%) | Control (%) | % Reduction |
|---|---|---|---|
| PE - Sample 2 | 7.4 | 14.5 | 49% |
| PE - Sample 1 | 5.9 | 15.4 | 62% |
| EVA - Sample 4 | 5.5 | 13 | 58% |
| EVA - Sample 3 | 4.1 | 15 | 73% |
| EVA - Sample 2 | 3.8 | 15 | 75% |
| EVA - Sample 1 | 8.6 | 20 | 57% |

Example 4—Splitting Force Strength

Figure 10:
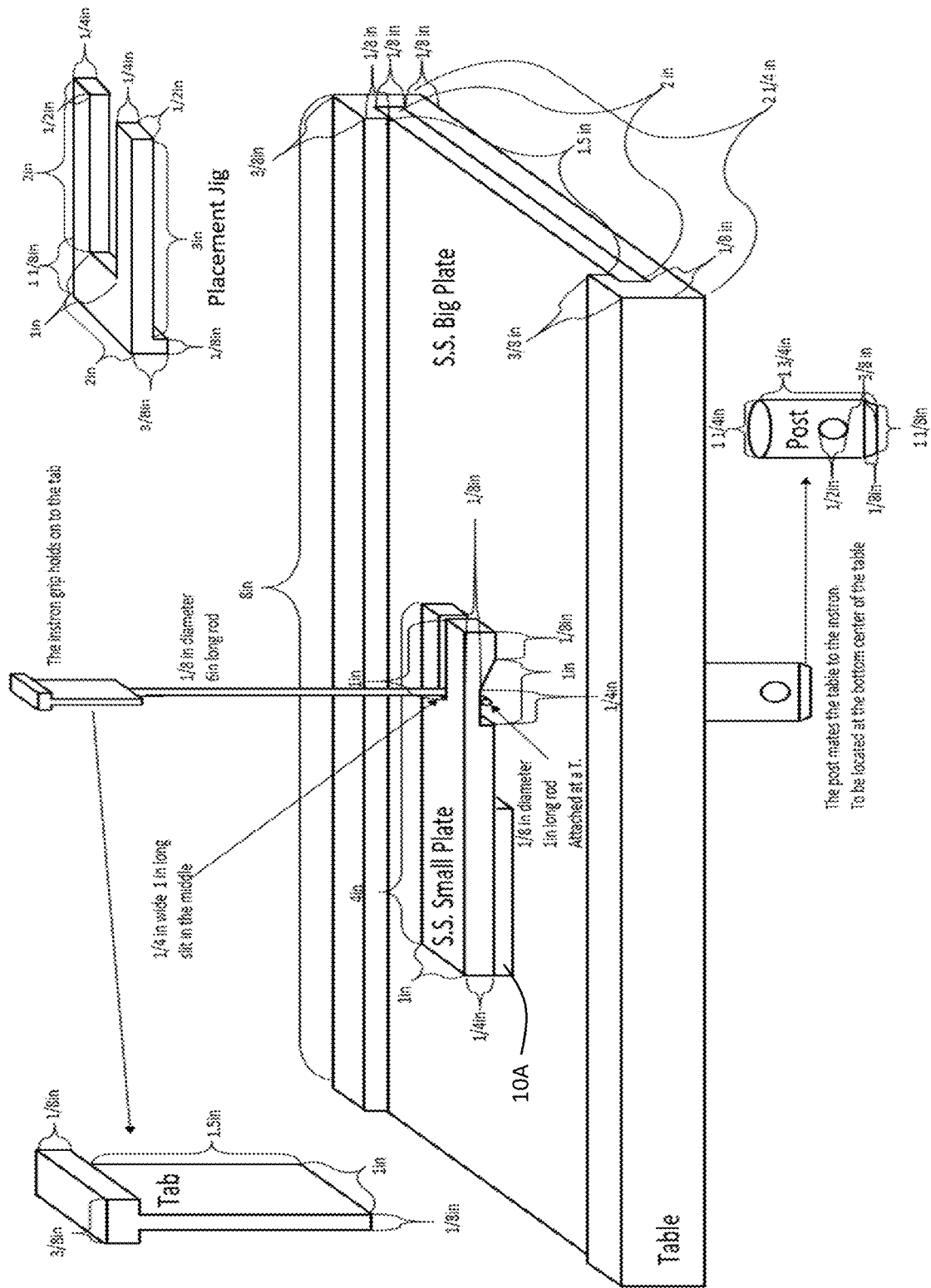
FIG. 10 is a schematic diagram of the splitting force strength testing apparatus according to the present disclosure.

Splitting force strength was measured for each irradiated sample of foam produced according to the experimental method above. Splitting force strength was measured according to the fabricated apparatus shown in FIG. 10 using the splitting force strength test method as follows. Each foam sample was corona treated on both sides, then a strong pressure sensitive adhesive was applied to both sides of the foam 10A to convert it into a double-sided foam tape. The foam tape was then cut down to 2 inch×1 inch specimens. Making sure the stainless steels of the jig were clean, the double-sided foam tape 10A was applied on to the small stainless-steel plate ("S. S. Small Plate" of FIG. 10), on the end without the slit and on the side without the indentation. Then, the small stainless steel and foam assembly was placed into the 2 inch wide slot of the placement jig, and then the placement jig's hook was placed at the end of the big stainless steel plate ("S.S. Big Plate" of FIG. 10). The small plate was pressed firmly onto the big plate and the placement jig was removed. The small stainless steel and foam assembly was located 1 inch away from the end of the big plate. The tape was allowed to cure for 24 hours. Thereafter, the big plate was slid into the table, and the post under the table was inserted into an instron machine. The horizontal rod was slid under the small plate, into the indented area, and the vertical rod was allowed to rise up into the slit. The instron grip pinched the tab at the end of the rod and was run in extension mode at 40 inches/min, measuring the splitting force in pounds in both the machine direction (MD) and cross-machine direction (CM) of the foam sheet samples.

The results are shown in TABLES 5A, 5B, and 5C below, and corresponding FIGS. 11A, 11B, and 11C, respectively.

TABLE 5A

| EVA Foam | | Sample 1 | Sample 2 | Sample 3 | Sample 4 | Control 1 | Control 2 | Control 3 | Control 4 |
|---|---|---|---|---|---|---|---|---|---|
| Density (pcf) | | 3.3 | 4.8 | 5.2 | 8.6 | 3.1 | 4.1 | 5.6 | 7.5 |
| Splitting Force | MD | 11.5 | 11.2 | 9.2 | 33.1 | 31.3 | 37.1 | 37.1 | 47.2 |
| (lb-f) | CM | 12.1 | 9.4 | 9.4 | 25.4 | 33.1 | X | X | X |
| | avg | 11.8 | 10.3 | 9.3 | 29.3 | 32.2 | 37.1 | 37.1 | 47.2 |

TABLE 5B

| PE Foam | | Sample 1 | Sample 2 | Control 1 | Control 2 | Control 3 |
|---|---|---|---|---|---|---|
| Density (pcf) | | 6.9 | 7.7 | 1.93 | 3.88 | 5.96 |
| Splitting Force | MD | 19.1 | 20.1 | 13.7 | 31.7 | 38.7 |
| (lb-f) | CM | 22.8 | 22.2 | 14.5 | X | X |
| | avg | 21.0 | 21.2 | 14.1 | 31.7 | 38.7 |

TABLE 5C

| PP Foam | | Sample 1 | Control 1 | Control 2 |
|---|---|---|---|---|
| Density (pcf) | | 2.6 | 2.1 | 4.2 |
| Splitting Force (lb-f) | MD | 16.1 | 19.8 | 30.7 |

Figure 11A:
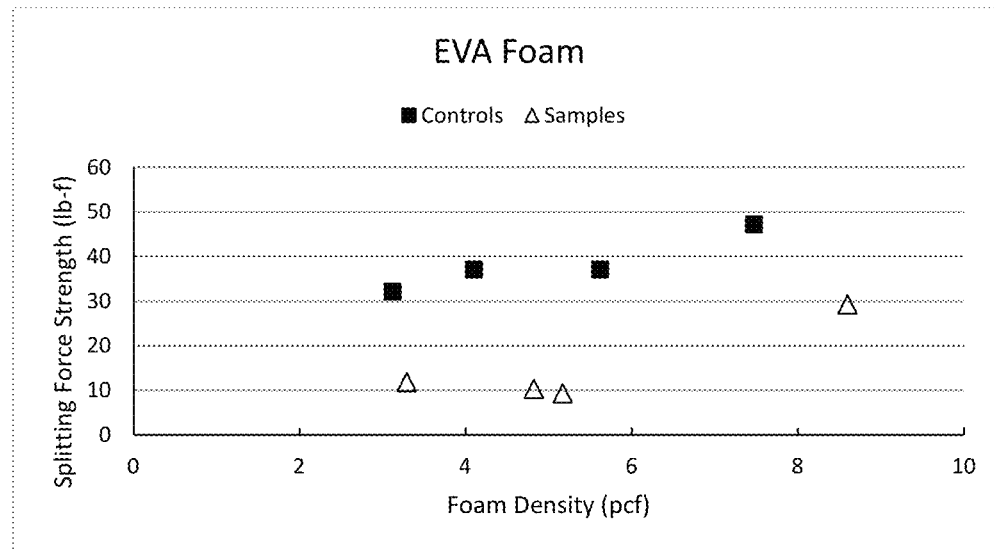
FIGS. 11A-11C are graphs of splitting force strength versus foam density for foam sheets according to the present disclosure.
Figure 11B:
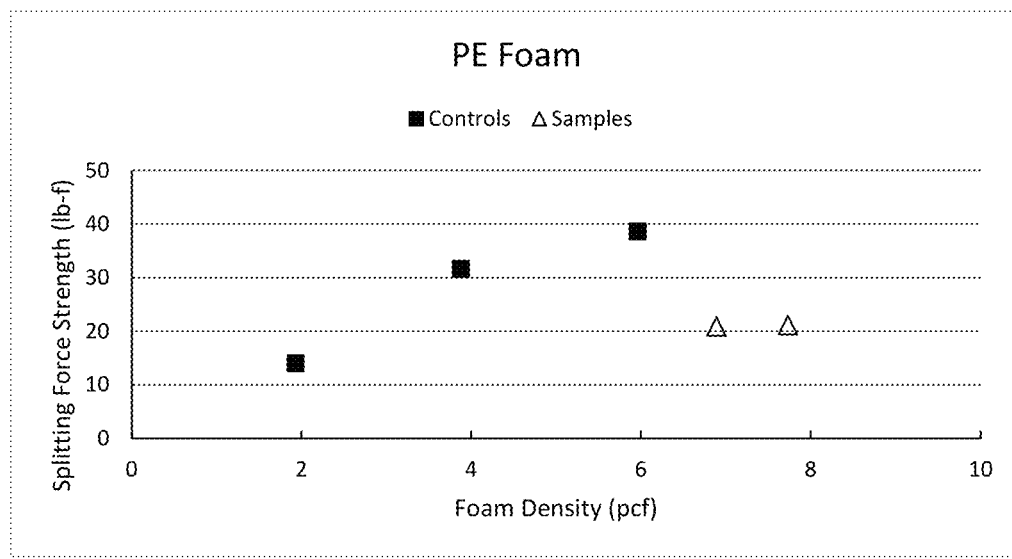
Figure 11C:
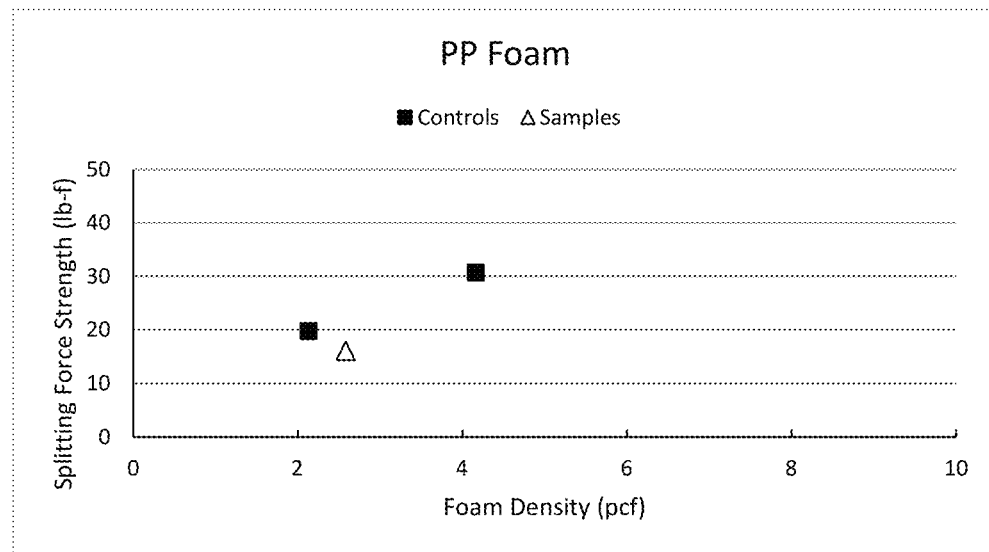

As shown in FIG. 11A, the force required to split the EVA foam samples was much lower than for the control samples regardless of density of the foam. As shown in FIG. 11B for PE foam samples, the same phenomenon was observed, though the lowest density control sample had a slightly lower splitting force strength than the much higher density sample foams. With respect to FIG. 11C, the PP foam sample had a lower splitting force strength than the control samples, including the control sample having a slightly lower density. These results show that for a given density of foam, the foam samples prepared according to the controlled depth cross-linking methods of the present disclosure will consistently have less splitting force strength than control foams.

Further, for each PP, PE and EVA sample (shown in TABLES 11A-11C), a splitting force strength was calculated for each control sample of a same density based on the trend data from FIGS. 9A and 9B respectively, and compared in TABLE 5D below. As shown, splitting force strength set was reduced (improved) in each PP, PE and EVA sample compared with the controls of a given density, the % reduction ranging from about 25% to about 80%.

TABLE 5D

| Splitting Force Strength Comparison | Sample (lb-f) | Control (lb-f) | % Reduction |
|---|---|---|---|
| PP - Sample 1 | 16.1 | 22.3 | 28% |
| PE - Sample 1 | 21 | 40 | 48% |
| PE - Sample 2 | 21.2 | 40.2 | 47% |
| EVA - Sample 4 | 29.3 | 58 | 49% |
| EVA - Sample 3 | 9.3 | 37.1 | 75% |
| EVA - Sample 2 | 10.3 | 37.1 | 72% |
| EVA - Sample 1 | 11.8 | 34 | 65% |

Example 5—T Peel Strength

T peel strength was measured for each irradiated sample of foam produced according to the experimental method above. The T peel strength test method was performed as follows. A 1 inch×6 inch specimen was cut out from each foam sample. The samples were partially split by splitting apart approximately 1 inch of the sample material by hand in the case of the foam samples produced by controlled depth crosslinking (having large cell size in core region), or by using a razor in the case of the control samples. The two ends from the partial split were pinched by the instron grips, and the instron was run in extension mode at 10 inches/min for 3 inches, measuring the max force to split the foam in half in pounds. It was observed that the foam samples produced with controlled depth crosslinking continued to split consistently and evenly over the entire 3 inches, while the control samples ripped unevenly shortly after the extension started.

The results are shown in TABLES 6A, 6B, and 6C below, and corresponding FIGS. 12A, 12B, and 12C, respectively.

TABLE 6A

| EVA Foam | | Sample 1 | Sample 2 | Sample 3 | Sample 4 | Control 1 | Control 2 | Control 3 | Control 4 |
|---|---|---|---|---|---|---|---|---|---|
| Density (pcf) | | 3.3 | 4.8 | 5.2 | 8.6 | 3.1 | 4.1 | 5.6 | 7.5 |
| Max Peel Strength | MD | 2.1 | 1.8 | 1.6 | 2.8 | 2.0 | 3.3 | 3.6 | 7.4 |
| 10 in/min (lb-f) | CM | 1.7 | 1.5 | 1.8 | 3.5 | 1.7 | 2.8 | 3.1 | 6.8 |
| | avg | 1.9 | 1.6 | 1.7 | 3.1 | 1.8 | 3.0 | 3.4 | 7.1 |

TABLE 6B

| PE Foam | | Sample 1 | Sample 2 | Control 1 | Control 2 | Control 3 | Control 4 |
|---|---|---|---|---|---|---|---|
| Density (pcf) | | 6.9 | 7.7 | 1.9 | 3.9 | 6.0 | 12.0 |
| Max Peel Strength | MD | 2.5 | 2.4 | 0.9 | 2.5 | 4.0 | 12.5 |
| 10 in/min (lb-f) | CM | 2.9 | 2.2 | 1.2 | 2.6 | 3.8 | |
| | avg | 2.7 | 2.3 | 1.0 | 2.5 | 3.9 | 12.5 |

TABLE 6C

| PP Foam | | Sample 1 | Control 1 | Control 2 |
|---|---|---|---|---|
| Density (pcf) | | 2.6 | 2.1 | 4.2 |
| Max Peel Strength | MD | 2.6 | 3.4 | 3.8 |
| 10 in/min (lb-f) | CM | 2.8 | 3.7 | 3.8 |
| | avg | 2.7 | 3.5 | 3.8 |

Figure 12A:
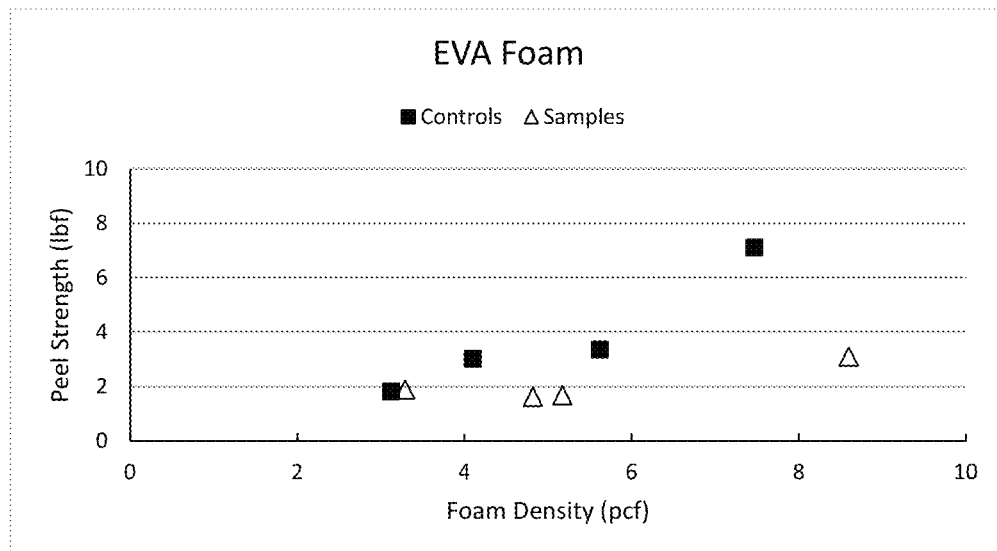
FIGS. 12A-12C are graphs of T peel strength versus foam density for foam sheets according to the present disclosure.
Figure 12B:
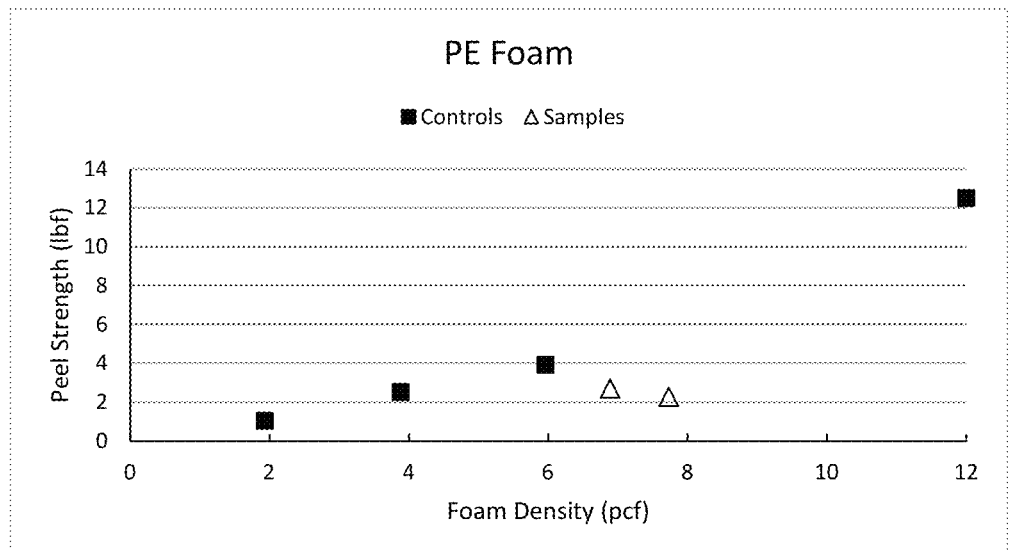
Figure 12C:
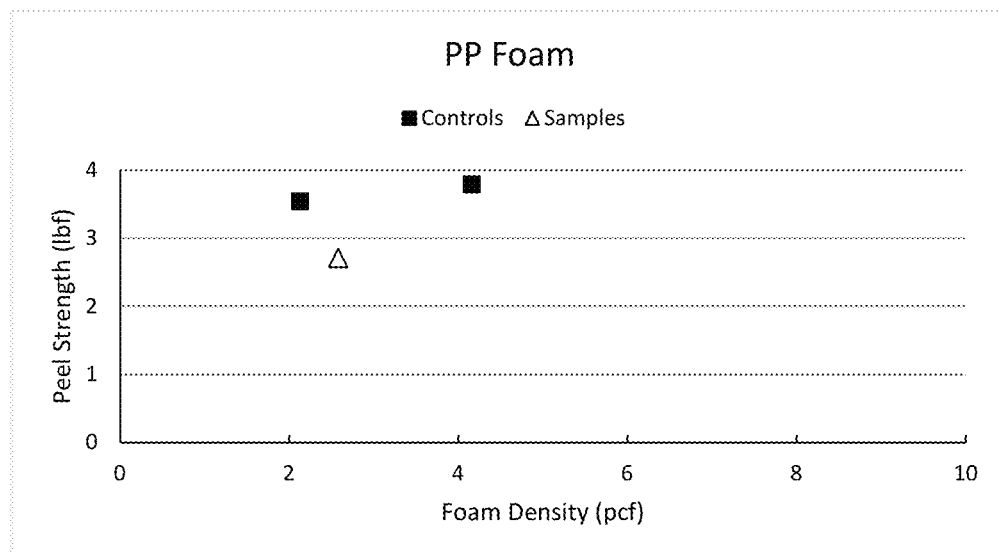

As shown in FIG. 12A, the T peel strength of the EVA foam samples was much lower than for the control samples, particularly as the density of the foam increased. As shown in FIG. 12B for PE foam samples, the same phenomenon was observed, though the lowest density control sample had a slightly lower T peel strength than the much higher density sample foams. With respect to FIG. 12C, the PP foam sample had a lower T peel strength than the control samples, including the control sample having a slightly lower density. These results show that for a given density of foam, the foam samples prepared according to the controlled depth crosslinking methods of the present disclosure will consistently have less T peel strength than control foams, as well as exhibiting a controlled tear propagation that the control foams cannot achieve.

Further, for each PP, PE and EVA sample (shown in TABLES 12A-12C), a T peel strength was calculated for each control sample of a same density based on the trend data from FIGS. 9A and 9B respectively, and compared in TABLE 6D below. As shown, T peel strength was reduced (improved) in each PP, PE and EVA sample compared with the controls of a given density, the % reduction ranging from about 25% to about 70%.

TABLE 6D

| T Peel Strength Comparison | Sample (lb-f) | Control (lb-f) | % Reduction |
|---|---|---|---|
| PP - Sample 1 | 2.7 | 3.6 | 25% |
| PE - Sample 2 | 2.3 | 5.1 | 54% |
| PE - Sample 1 | 2.7 | 6.0 | 55% |
| EVA - Sample 4 | 3.1 | 10 | 69% |
| EVA - Sample 3 | 1.7 | 3.2 | 47% |
| EVA - Sample 2 | 1.6 | 3.2 | 50% |
| EVA - Sample 1 | 1.9 | 1.9 | 0% |

Example 6—Post-Crosslinking: Heat Resistance

Heat resistance was measured for each irradiated sample of foam produced according to the experimental method above. EVA foam samples were produced with the controlled depth crosslinking method, and post-crosslinking (post-XL) samples were produced by subjecting the EVA foam samples to post-foaming irradiation until their core regions had a gel content of at least 50%. These samples were both compared against standard EVA control foams of comparable density to determine their ability to withstand 21 seconds of extreme heat in a thermal former such that the surface temperature of the foams reached around 225 C. The results are shown in TABLE 7 below.

TABLE 7

| Heat Resistance Test (Surface Temp 225 C. after 21 sec) | Surface Degradation? | Blistering? |
|---|---|---|
| EVA Control Foam | Yes | No |
| EVA Foam Sample | Yes | Yes |
| EVA Foam Sample + Post-XL | Yes | No |

The EVA control foam showed areas of surface degradation, signifying the heat was above the foam's maximum process temperature. The EVA foam sample (having lower gel content core) not only had surface degradation, but severe cases of blistering all over the surface. Blistering was caused by the large core cells rupturing, combining multiple cells into larger cells that appear as blisters under the surface. This happened to the EVA foam sample because the gel in the core area was low and too weak to be heat stable. However, the post-crosslinked (post-XL) EVA foam sample received an additional dose of irradiation, strengthening the foam in the core area and increasing gel content there, while preserving the large cell structure. As a result, the foam surprisingly no longer blistered, but only exhibited surface degradation from the excessive heat, much like the standard EVA control foam. Accordingly, the controlled tear propagation and other performance benefits of the foam samples may be preserved while also imparting heat resistance features to the foam through post-crosslinking.

Example 7—Post-Crosslinking: Dent Depth Recovery

Dent depth recovery was measured for each irradiated sample of foam produced according to the experimental method above. EVA foam samples were produced with the controlled depth crosslinking method, and post-crosslinking (post-XL) samples were produced by subjecting the EVA foam samples to post-foaming irradiation until their core regions had a gel content of at least 50%. These samples were both compared against standard EVA control foams of comparable density to determine their dent depth recovery performance as measured by automotive test standard VDA237-101-2 after 24, 48 and 168 hours. The results are shown in TABLE 8A below.

TABLE 8A

Dent depth relative to original foam (2 mm) thickness

| Dent Depth | | EVA Control Foam | EVA Foam Sample | EVA Foam Sample (+Post-XL) |
|---|---|---|---|---|
| 1 kg Dent (mm) | 0 h | 66% | 41% | 52% |
| | 24 h | 18% | 13% | 12% |
| | 48 h | 9% | 8% | 6% |
| | 168 h | 6% | 6% | 5% |
| 2 kg Dent (mm) | 0 h | 90% | 38% | 50% |
| | 24 h | 45% | 10% | 16% |
| | 48 h | 28% | 6% | 13% |
| | 168 h | 15% | 4% | 10% |

Figure 13:
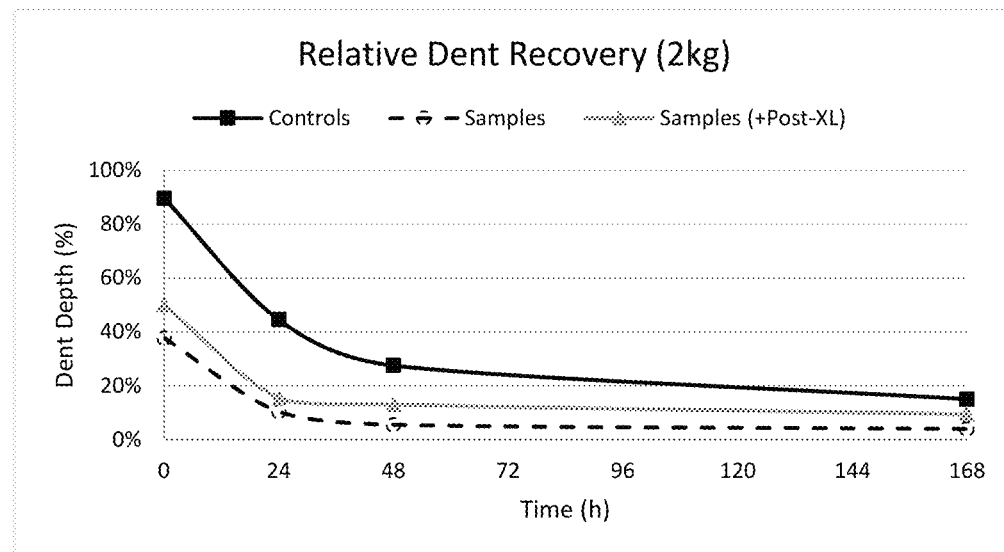
FIG. 13 is a graph of dent depth recovery for foam sheets according to the present disclosure.

FIG. 13 is a graph of the 2 kg dent depth recovery shown in TABLE 8. As can be seen, both EVA samples including the post-crosslinked one display superior dent depth recovery to the standard EVA control foam, while the post-crosslinked sample only suffers a marginal performance reduction compared with the EVA sample that wasn't post-crosslinked. Accordingly, the mechanical and performance features of the foam samples produced according to the method of the present disclosure can largely be preserved even after the benefits of post-crosslinking are imparted on such samples.

Further, the % improvement in dent depth recovery was also individually compared between EVA control foam versus the EVA foam sample, and EVA control foam versus EVA Foam Sample (+Post-XL) as shown in TABLE 8B below.

TABLE 8B

% Improvement in Dent Depth Recovery

| | Control vs. EVA Sample | Control vs. EVA Sample (+Post-XL) |
|---|---|---|
| 0 h | 57.9% | 44.1% |
| 24 h | 76.7% | 65.2% |
| 48 h | 80.0% | 52.7% |
| 168 h | 73.3% | 36.7% |

As can be seen in TABLE 8B, dent depth recovery of the EVA Sample was improved by 55% to about 80% versus the control, while the dent depth recovery of the EVA Sample that was post-crosslinked was improved by about 35% to about 65%.

Example 8—Split Foam Gauge, Mass and Density

Foam samples produced according to the experimental method above for controlled depth crosslinking were measured for gauge and mass before and after splitting them apart using controlled tear propagation down the intermediate/core region of the foam such as described previously with reference to FIGS. 4-6, such that the resulting split foam samples could be evaluated for their consistency in gauge, mass and calculated density. Mass was measured using a calibrated scale, and gauge was measured using a calibrated micrometer.

In the machine direction, ten 4 inch×4 inch specimens were cut from the center of the foam sheet sample at 1 inch spacing. The gauge and mass were measured and used to calculate the density of each specimen. Then, each specimen was split using controlled tear propagation into an A-side and B-side. The gauge and mass of each A-side and B-side split foam sample was then measured and corresponding density was calculated. Since some deformation of the foam specimens would occur from the force of splitting it, the gauge measurements were taken from non-deformed areas of the split foam sides.

In the cross-machine direction, ten 4 inch×4 inch specimens were cut across the width of the foam sheet sample at even intervals, and for sheets that were too narrow to obtain ten specimens, then as many specimens as possible were collected as allowed by the dimensions of the sheet (7 specimens for the 8 pcf PE foam sample, and 8 specimens for the 6.5 pcf EVA foam sample). The first and last specimen were collected from the very edges of the foam sheet. Otherwise, gauge and mass were collected for the foam before and after splitting, and density was calculated, according to the same method as described with reference to the machine direction above.

The gauge, mass and density were then averaged across all the specimens from each foam sample, and each value was compared before and after splitting the foam. The machine direction (MD) comparison is provided in TABLE 9A below, while the cross-machine (CM) comparison is provided in TABLE 9B below. Each value is expressed as a percentage of the original unsplit foam sample, such that a perfectly and evenly split foam would yield, for each side, an ideal A-side average as well as a B-side average gauge and mass as close as possible to 50% of the original unsplit sample, as well as a density as close as possible to 100%. The maximum amount of variance for the samples from the ideal values was also determined and is shown in the TABLES 9A, 9B below, as well as the average variance of the samples from ideal.

TABLE 9A

| MD | Gauge (%) | | Mass (%) | | Density (%) | |
|---|---|---|---|---|---|---|
| | A-side avg | B-side Avg | A-side avg | B-side Avg | A-side avg | B-side Avg |
| 2.5 pcf PP | 49% | 53% | 50% | 50% | 102% | 95% |
| 5.2 pcf EVA | 51% | 51% | 51% | 49% | 99% | 97% |
| 8 pcf PE | 66% | 48% | 57% | 43% | 86% | 90% |
| 6.5 pcf EVA | 53% | 53% | 49% | 51% | 93% | 96% |
| Total Avg | 55% | 51% | 52% | 48% | 95% | 94% |
| Max Variance | 16% | 3% | 7% | 7% | 14% | 10% |
| Avg Variance | 5% | 1% | 2% | 2% | 5% | 6% |

TABLE 9B

| CM | Gauge (%) | | Mass (%) | | Density (%) | |
|---|---|---|---|---|---|---|
| | A-side avg | B-side Avg | A-side avg | B-side Avg | A-side avg | B-side Avg |
| 2.5 pcf PP | 52% | 50% | 51% | 49% | 97% | 99% |
| 5.2 pcf EVA | 51% | 50% | 50% | 50% | 97% | 100% |
| 8 pcf PE | 46% | 65% | 43% | 57% | 94% | 87% |
| 6.5 pcf EVA | 57% | 56% | 49% | 51% | 87% | 91% |
| Total Avg | 52% | 55% | 48% | 52% | 94% | 94% |
| Max Variance | 7% | 15% | 7% | 7% | 13% | 13% |
| Max Avg Variance | 2% | 5% | 2% | 2% | 6% | 6% |

In some cases, dimensional deformities in the foam samples created some minor inconsistencies in gauge measurements leading to A-side and B-side totals which sometimes did not equal 100%. Since density is a function of gauge and mass, the density calculation likewise was affected in such cases. However, based on the number of sample specimens studied, the data nonetheless has a high confidence level.

As can be seen from the TABLES 9A and 9B, the maximum amount of gauge variance of a split foam specimen was 16%, but on average, was only 5% at most. For mass, the maximum amount of variance of a split foam specimen was 7%, but on average, was only 2% at most. For density, the maximum amount of variance of a split foam specimen was 14%, but on average, was only 6% at most. Therefore, the foam samples produced by the experimental method had a tear propagation that was highly consistent through the core of the foam, leading to A-sides and B-sides having very little average variance in gauge, mass and density, making this method of the present disclosure highly suitable for mass production of foam such as described with reference to FIG. 6.

Example 9—Peak Heights

Figure 14:
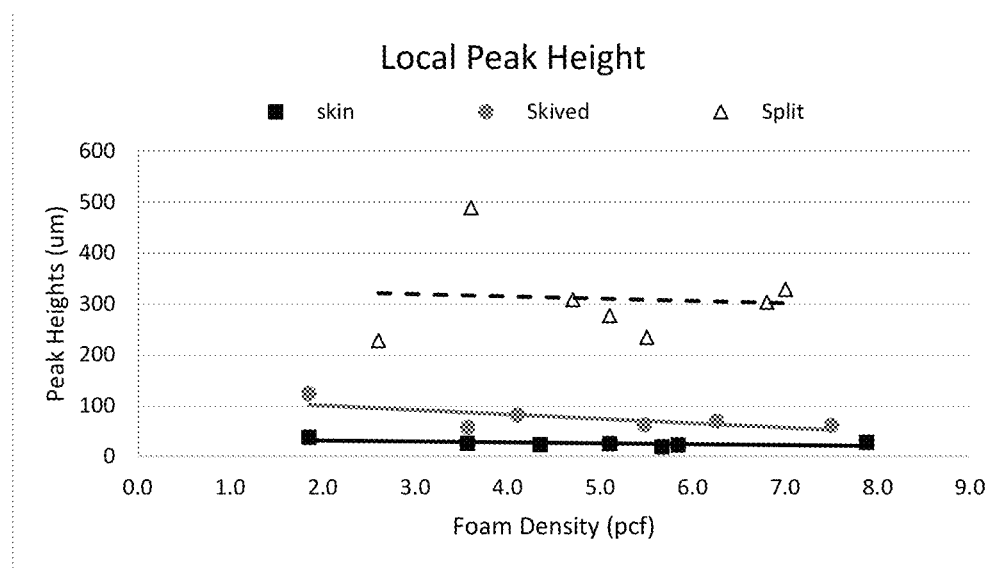
FIG. 14 is a graph of peak heights versus foam density for split foam sheets according to the present disclosure.

Foam samples produced according to the experimental method above for controlled depth crosslinking were measured under a 3D microscope to assess surface peak heights. In particular, split foam samples that were torn apart using controlled tear propagation down the intermediate/core region of the foam such as described previously with reference to FIGS. 4-6 were measured for peak heights on the new open cell surface (such as 22A and 22B as shown in FIGS. 5A and 5B) as well as measuring the same surface for standard foam samples that had been skived apart using a blade. Further, peak heights were also measured on the skin side surface (closed cell surface, such as side A and B in FIGS. 5A and 5B) as a control. A Keyence 3D microscope VHX-6000 was used to determine peak heights by placing each specimen under the microscope, and using the built-in function, scanning a 5 mm×5 mm area. The base-height was established by taking the average of the entire heights within the scanned area. Local high peaks were selected, and the peak heights were measured relative to the established base-height using the microscope's function. The results are shown in TABLES 10A, 10B and 10C below for each density of foam sample measured, and were further graphed as shown in FIG. 14.

TABLE 10A

| | Skin | |
|---|---|---|
| Material | Foam Density (pcf) | Peak Height Ave (μm) |
| EVA - Sample 1 | 3.6 | 26.1 |
| EVA - Sample 2 | 7.9 | 27.8 |
| EVA - Sample 3 | 5.1 | 25.7 |
| PE - Sample 1 | 1.8 | 38 |
| PE - Sample 2 | 5.8 | 23.1 |
| PP - Sample 1 | 4.3 | 23.8 |
| PP - Sample 2 | 5.7 | 19.4 |
| Total Average | | 26.3 |

TABLE 10B

| | Skived | |
|---|---|---|
| Material | Foam Density (pcf) | Peak Height Ave (μm) |
| EVA - Sample 1 | 7.5 | 61.4 |
| EVA - Sample 2 | 3.6 | 57.4 |
| PE - Sample 1 | 1.8 | 62.5 |
| PE - Sample 2 | 5.8 | 123.5 |
| PP - Sample 1 | 4.1 | 81.2 |
| PP - Sample 2 | 6.3 | 69.6 |
| Total Average | | 75.9 |

TABLE 10C

| | Split | |
|---|---|---|
| Material | Foam Density (pcf) | Peak Height Ave (μm) |
| PE - Sample 1 | 5.5 | 234.1 |
| PE - Sample 2 | 7 | 328.4 |
| EVA - Sample 1 | 3.6 | 489.3 |
| EVA - Sample 2 | 4.7 | 308.7 |
| EVA - Sample 3 | 5.1 | 277.4 |
| EVA - Sample 4 | 6.8 | 303.6 |
| PP - Sample 1 | 2.6 | 227.8 |
| Total Average | | 309.9 |

As can be seen from the results of the measurements and FIG. 14, the split foam open cell surfaces of each sample had much higher average peak heights than either the skived or the skin surface of comparable foams. Comparing average peak heights, the split foam surface was about 11.8 times higher than skin, and about 4.1 times higher than skived foam surfaces.

Example 10—Surface Roughness

Figure 15:
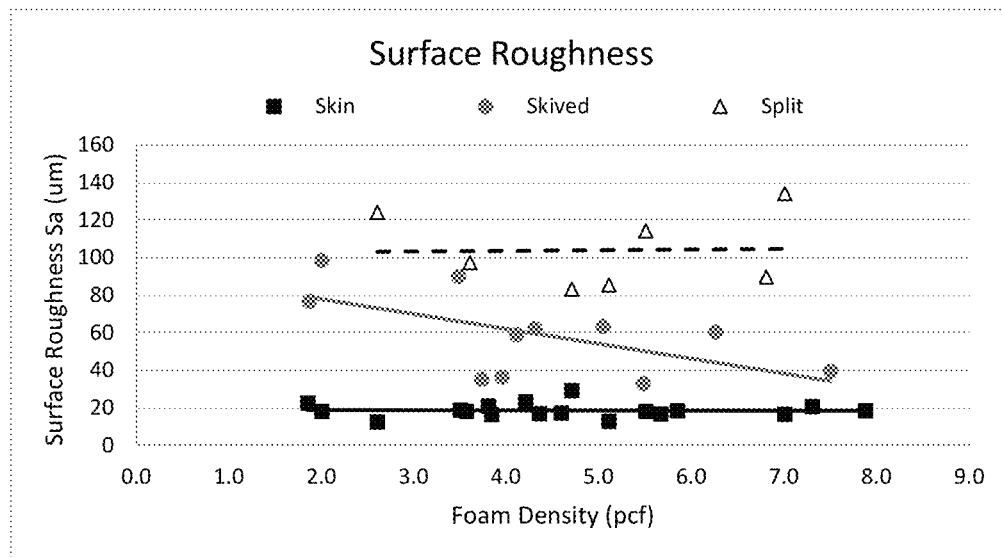
FIG. 15 is a graph of surface roughness versus foam density for split foam sheets according to the present disclosure.

Foam samples produced according to the experimental method above for controlled depth crosslinking were measured under a 3D microscope to assess surface roughness. In particular, split foam samples that were torn apart using controlled tear propagation down the intermediate/core region of the foam such as described previously with reference to FIGS. 4-6 were measured for surface roughness on the new open cell surface (such as 22A and 22B as shown in FIGS. 5A and 5B) as well as measuring the same surface for standard foam samples that had been skived apart using a blade. Further, surface roughness was also measured on the skin side surface (closed cell surface, such as side A and B in FIGS. 5A and 5B) as a control. A Keyence 3D microscope VHX-6000 was used to determine surface roughness by placing each specimen under the microscope, and using the built-in function, scanning a 5 mm×5 mm area, with surface areas measured by the microscope to calculate a roughness value Sa. Sa is the arithmetic average of the surface roughness, and is the extension of Ra arithmetical mean height of a line. It expresses, as an absolute value, the difference in height of each point compared to the arithmetical mean of the surface. The results are shown in TABLES 11A, 11B and 11C below for each density of foam sample measured, and were further graphed as shown in FIG. 15.

TABLE 11A

| | Skin | |
|---|---|---|
| Material | Foam Density (pcf) | Sa (μm) |
| EVA - Sample 1 | 3.6 | 18.10 |
| EVA - Sample 2 | 7.9 | 18.37 |
| EVA - Sample 3 | 4.2 | 23.21 |
| EVA - Sample 4 | 4.7 | 29.08 |
| EVA - Sample 5 | 5.1 | 12.72 |
| EVA - Sample 6 | 3.8 | 21.01 |
| EVA - Sample 7 | 7.3 | 20.61 |
| PE - Sample 1 | 1.8 | 22.46 |
| PE - Sample 2 | 3.8 | 16.40 |
| PE - Sample 3 | 5.8 | 18.37 |
| PE - Sample 4 | 5.5 | 18.10 |
| PE - Sample 5 | 7.0 | 16.44 |
| PP - Sample 1 | 3.5 | 18.79 |
| PP - Sample 2 | 4.6 | 17.26 |
| PP - Sample 3 | 4.3 | 16.91 |
| PP - Sample 4 | 5.7 | 16.67 |
| PP - Sample 5 | 2.0 | 18.12 |
| PP - Sample 6 | 2.6 | 12.40 |
| Total Average | | 18.61 |

TABLE 11B

| | Skived | |
|---|---|---|
| Material | Foam Density (pcf) | Sa (μm) |
| EVA - Sample 1 | 3.7 | 35.24 |
| EVA - Sample 2 | 7.5 | 39.40 |
| EVA - Sample 3 | 4.3 | 62.25 |
| PE - Sample 1 | 1.9 | 76.60 |
| PE - Sample 2 | 3.9 | 36.21 |
| PE - Sample 3 | 5.5 | 32.88 |
| PP - Sample 1 | 3.5 | 89.84 |
| PP - Sample 2 | 5.0 | 63.35 |
| PP - Sample 3 | 2.0 | 98.48 |
| PP - Sample 4 | 4.1 | 58.88 |
| PP - Sample 5 | 6.3 | 60.28 |
| Total Average | | 59.40 |

TABLE 11C

| | Split | |
|---|---|---|
| Material | Foam Density (pcf) | Sa (μm) |
| EVA - Sample 1 | 4.7 | 83.09 |
| EVA - Sample 2 | 5.1 | 85.44 |
| EVA - Sample 3 | 3.6 | 97.26 |
| EVA - Sample 4 | 6.8 | 89.66 |
| PE - Sample 1 | 5.5 | 114.19 |
| PE - Sample 2 | 7.0 | 134.06 |
| PP - Sample 1 | 2.6 | 124.00 |
| Total Average | | 103.96 |

As can be seen from the results of the measurements and FIG. 15, the split foam open cell surfaces of each sample had much higher surface roughness than either the skived or the skin surface of comparable foams. Comparing average surface roughness, the split foam surface was about 6 times higher than skin, and about 1.8 times higher than skived foam surfaces.

Example 11—Coefficient of Friction (COF)

Figure 16A:
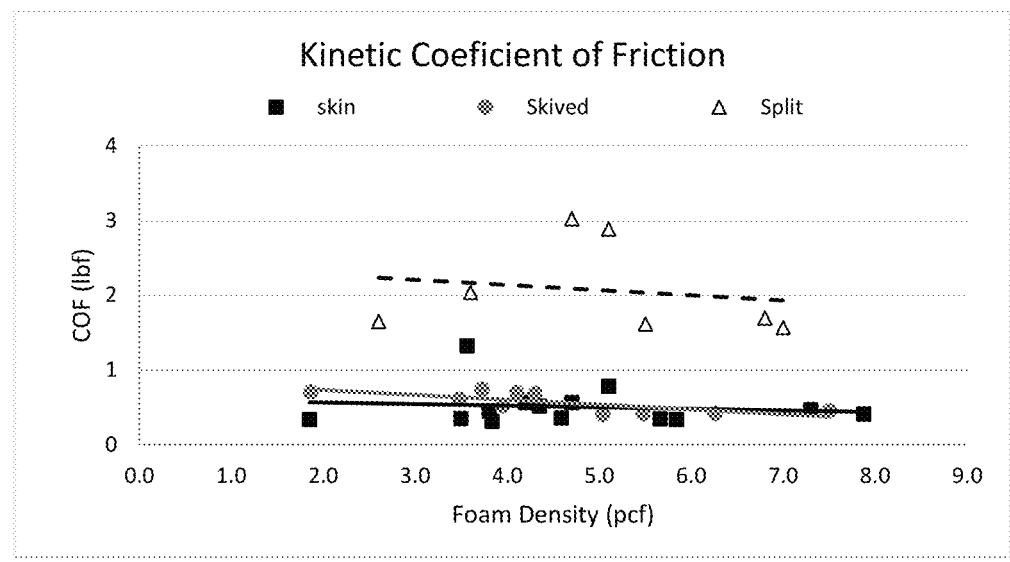
FIG. 16A is a graph of the kinetic coefficient of friction versus foam density for split foam sheets according to the present disclosure.
Figure 16B:
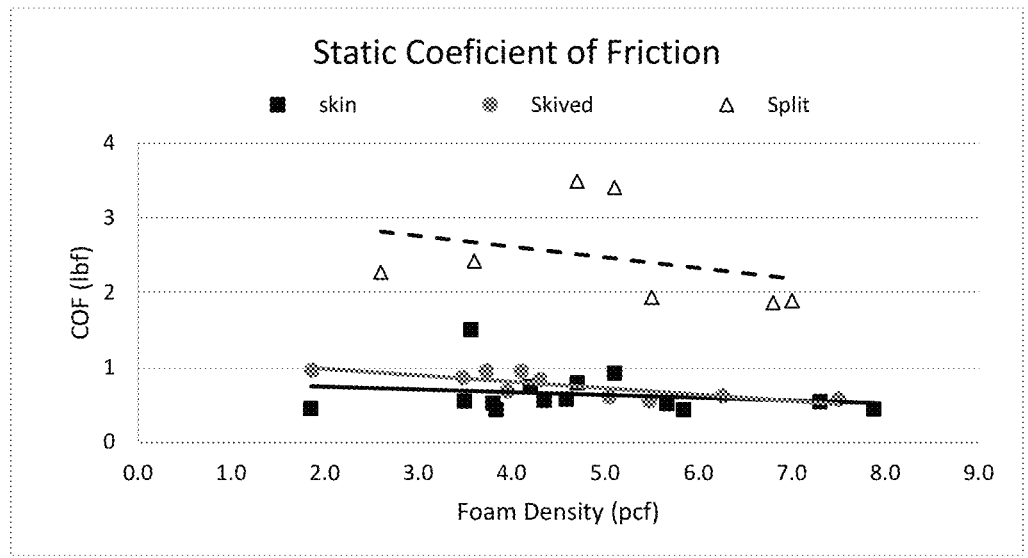
FIG. 16B is a graph of the static coefficient of friction versus foam density for split foam sheets according to the present disclosure.

Foam samples produced according to the experimental method above for controlled depth crosslinking were assessed according to ASTM D1894 to measure their coefficient of friction (COF), both kinetic COF and static COF. In particular, split foam samples that were torn apart using controlled tear propagation down the intermediate/core region of the foam such as described previously with reference to FIGS. 4-6 were measured for COF on the new open cell surface against the opposing open cell surface (such as 22A against 22B as shown in FIGS. 5A and 5B) as well as measuring the same opposing surfaces for standard foam samples that had been skived apart using a blade. Further, COF was also measured on opposing skin side surface (closed cell surface, such as side A against side B in FIGS. 5A and 5B) as a control. The results are shown in TABLES 12A, 12B and 12C below for each density of foam sample measured, and were further graphed as shown in FIGS. 16A and 16B.

TABLE 12A

Skin-Skin

| Material | Foam Density (pcf) | Avg Static (lbf) | Avg Kinetic (lbf) |
|---|---|---|---|
| EVA - Sample 1 | 3.6 | 1.5023 | 1.3200 |
| EVA - Sample 2 | 7.9 | 0.4426 | 0.4101 |
| EVA - Sample 3 | 4.2 | 0.7409 | 0.5604 |
| EVA - Sample 4 | 4.7 | 0.7950 | 0.5632 |
| EVA - Sample 5 | 5.1 | 0.9215 | 0.7809 |
| EVA - Sample 6 | 3.8 | 0.5207 | 0.4529 |
| EVA - Sample 7 | 7.3 | 0.5401 | 0.4688 |
| PE - Sample 1 | 1.8 | 0.4514 | 0.3360 |
| PE - Sample 2 | 3.8 | 0.4331 | 0.3108 |
| PE - Sample 3 | 5.8 | 0.4336 | 0.3368 |
| PP - Sample 1 | 3.5 | 0.5485 | 0.3469 |
| PP - Sample 2 | 4.6 | 0.5728 | 0.3579 |
| PP - Sample 3 | 4.3 | 0.5560 | 0.5144 |
| PP - Sample 4 | 5.7 | 0.5142 | 0.3418 |
| PE - Sample 5 | 5.5 | 0.3848 | 0.2584 |
| PE - Sample 6 | 7 | 0.4106 | 0.2588 |
| PP - Sample 5 | 2.6 | 0.5559 | 0.4232 |
| Total Average | | 0.6073 | 0.4730 |

TABLE 12B

Skived-Skived

| Material | Foam Density (pcf) | Avg Static (lbf) | Avg Kinetic (lbf) |
|---|---|---|---|
| EVA - Sample 1 | 3.7 | 0.9500 | 0.7445 |
| EVA - Sample 2 | 7.5 | 0.5752 | 0.4517 |
| EVA - Sample 3 | 4.3 | 0.8379 | 0.6850 |
| PE - Sample 1 | 1.9 | 0.9619 | 0.7068 |
| PE - Sample 2 | 3.9 | 0.6826 | 0.5189 |
| PE - Sample 3 | 5.5 | 0.5486 | 0.4113 |
| PP - Sample 1 | 3.5 | 0.8613 | 0.6047 |
| PP - Sample 2 | 5.0 | 0.6034 | 0.3999 |
| PP - Sample 3 | 4.1 | 0.9460 | 0.7007 |
| PP - Sample 4 | 6.3 | 0.6187 | 0.4156 |
| Total Average | | 0.7585 | 0.5639 |

TABLE 12C

Split-Split

| Material | Foam Density (pcf) | Avg Static (lbf) | Avg Kinetic (lbf) |
|---|---|---|---|
| EVA - Sample 1 | 4.7 | 3.4905 | 3.0201 |
| EVA - Sample 2 | 5.1 | 3.4031 | 2.8820 |
| EVA - Sample 3 | 3.6 | 2.4210 | 2.0361 |
| EVA - Sample 4 | 6.8 | 1.8622 | 1.6941 |
| PE - Sample 1 | 5.5 | 1.9382 | 1.6119 |
| PE - Sample 2 | 7 | 1.8896 | 1.5659 |
| PP - Sample 1 | 2.6 | 2.2686 | 1.6443 |
| Total Average | | 2.4676 | 2.0649 |

As can be seen from the results of the measurements and FIGS. 16A and 16B, the split foam open cell surfaces of each sample had a much higher COF, both static and kinetic, than either the skived or the skin surfaces of comparable foams. Comparing average static COF, the split foam surface was about 4.1 times higher than skin, and about 3.3 times higher than skived foam surfaces. Comparing average kinetic COF, the split foam surface was about 4.4 times higher than skin, and about 3.7 times higher than skived foam surfaces.

Example 12—Transmittance Acoustic

Foam samples produced according to the experimental method above for controlled depth crosslinking were assessed for their transmittance acoustic properties to determine the average sound reduction achieved by the foam. In particular, split foam samples that were torn apart using controlled tear propagation down the intermediate/core region of the foam such as described previously with reference to FIGS. 4-6 were measured for average sound reduction across the new open cell surface (such as 22A or 22B as shown in FIGS. 5A and 5B) as well as measuring the same for standard foam samples that had been skived apart using a blade. Further, average sound reduction was also measured on skin side surfaces (closed cell surface, such as side A or side B in FIGS. 5A and 5B) as a control.

The transmittance acoustic test method was performed as follows. Two 4-inch-long×12 inch diameter PVC pipes were prepared. One end of both pipes with closed with 1-inch thick wood pieces. A ¾-inch diameter hole was drilled in the center of one of the wood pieces. The pipe without the drilled hole was placed on the table, wood end down. A bluetooth speaker was placed in the center of the first pipe, facing up. A 12-inch×12-inch foam specimen was placed on the first PVC pipe opening with the tested surface facing the speaker. The second PVC pipe with the drilled hole was used to sandwich the specimen, with wood facing up. A decibel meter was inserted through the hole on top, approximately 3 inches above the foam specimen. A tone generator software application was used to play a tone ranging from 1000 Hz to 20,000 Hz at 1000 Hz intervals, and the resulting decibels passing through the foam specimen were recorded, making sure the volume was not too loud to avoid maxing out the decibel meter's functional range. The process was then repeated without the foam specimen to generate the baseline control measurement. Once data was collected, a best fit linear line was generated through the data to find the equation. Using the equation, the dB at 1000 Hz and 20000 Hz was calculated, and then the specimen values were subtracted from the baseline values to generate the sound reduction value. Then, the average sound reduction value was calculated to generate one value to describe the level of sound reduction from the specimen tested. The average sound reduction value was then graphed relative to the calculated basis weight of each foam specimen.

Figure 17:
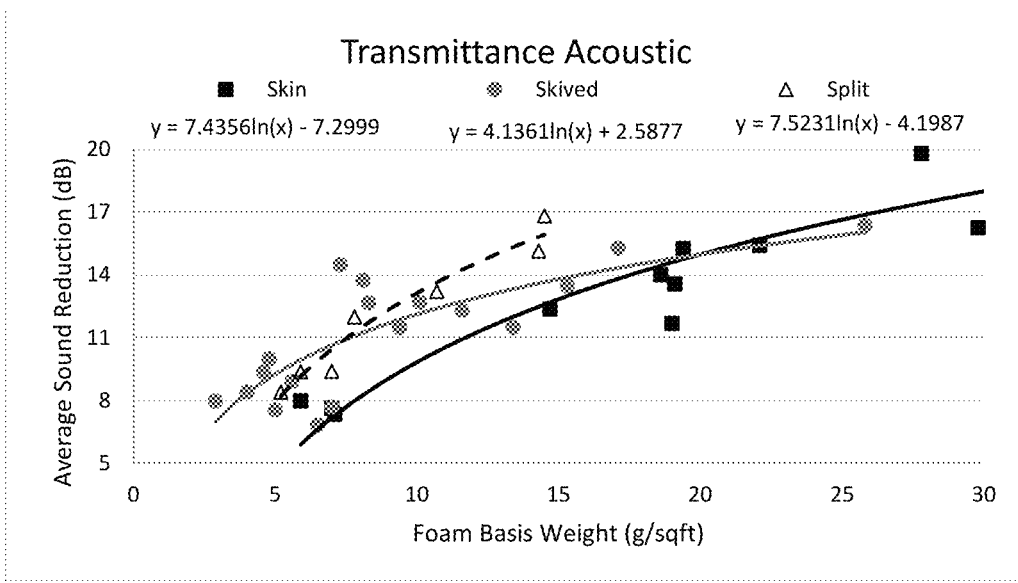
FIG. 17 is a graph of average sound reduction (transmittance acoustic) versus foam basis weight for split foam sheets according to the present disclosure.

The average sound reduction results are shown in TABLES 13A, 13B and 13C below for each basis weight of foam sample measured and were further graphed as shown in FIG. 17.

TABLE 13A

Skin

| Material | Basis Weight (g/sqft) | Ave dB Reduction |
|---|---|---|
| PE - Sample 1 | 114.5 | 28.1 |
| EVA - Sample 1 | 5.9 | 8.0 |
| EVA - Sample 2 | 7.1 | 7.4 |
| EVA - Sample 3 | 19.1 | 13.6 |
| EVA - Sample 4 | 19.4 | 15.3 |
| EVA - Sample 5 | 30.8 | 15.2 |
| EVA - Sample 6 | 42.7 | 20.5 |
| PE - Sample 2 | 7.0 | 7.6 |
| PE - Sample 3 | 14.7 | 12.4 |

TABLE 13A-continued

Skin

| Material | Basis Weight (g/sqft) | Ave dB Reduction |
|---|---|---|
| PE - Sample 4 | 22.1 | 15.4 |
| PE - Sample 5 | 27.8 | 19.8 |
| PE - Sample 6 | 29.8 | 16.3 |
| PE - Sample 7 | 43.6 | 22.3 |
| PE - Sample 8 | 58.6 | 25.6 |
| PP - Sample 1 | 18.6 | 14.0 |
| PP - Sample 2 | 19.0 | 11.7 |

TABLE 13B

Skived

| Material | Basis Weight (g/sqft) | Ave dB Reduction |
|---|---|---|
| EVA - Sample 1 | 17.1 | 15.29 |
| EVA - Sample 2 | 25.8 | 16.39 |
| PE - Sample 1 | 5.0 | 7.57 |
| PE - Sample 2 | 6.5 | 6.83 |
| PE - Sample 3 | 8.1 | 13.75 |
| PE - Sample 4 | 15.3 | 13.49 |
| PE - Sample 5 | 5.6 | 8.93 |
| PE - Sample 6 | 10.1 | 12.71 |
| EVA - Sample 3 | 8.3 | 12.68 |
| EVA - Sample 4 | 4.6 | 9.35 |
| PP - Sample 1 | 4.0 | 8.43 |
| PP - Sample 2 | 9.4 | 11.48 |
| PP - Sample 3 | 2.9 | 7.98 |
| PP - Sample 4 | 4.8 | 10.01 |
| PP - Sample 5 | 13.4 | 11.49 |
| PP - Sample 6 | 7.0 | 7.69 |
| PP - Sample 7 | 7.3 | 14.5 |
| PP - Sample 8 | 11.6 | 12.32 |

TABLE 13C

Split

| Material | Basis Weight (g/sqft) | Ave dB Reduction |
|---|---|---|
| PE - Sample 1 | 14.3 | 15.2 |
| PE - Sample 2 | 14.5 | 16.8 |
| EVA - Sample 1 | 7.0 | 9.4 |
| EVA - Sample 2 | 10.7 | 13.2 |
| EVA - Sample 3 | 5.9 | 9.4 |
| EVA - Sample 4 | 7.8 | 12.0 |
| PP - Sample 1 | 5.2 | 8.4 |

As can be seen from the results of the measurements and FIG. 17, the split foam open cell surface samples had superior average sound reduction performance compared with standard skin surfaces of foam for all basis weights of foam. In comparison to skived standard foam, the split foam surface had superior average sound reduction performance for basis weights of foam at about 7 g/sqft or above.

Example 13—Surface Water Retention

Foam samples produced according to the experimental method above for controlled depth crosslinking were assessed for their surface water retention properties. In particular, split foam samples that were torn apart using controlled tear propagation down the intermediate/core region of the foam such as described previously with reference to FIGS. 4-6 were measured for surface water retention properties on the new open cell surfaces (such as 22A or 22B as shown in FIGS. 5A and 5B) as well as measuring the same for standard foam samples that had been skived apart using a blade. Further, surface water retention was also measured on skin side surfaces (closed cell surface, such as side A or side B in FIGS. 5A and 5B) as a control.

The surface water retention test method was performed as follows. 4-inch×4-inch foam specimens and a shallow vat of water were prepared. Each specimen was dry weighed, then the specimen's side of interest was placed onto the water so it floated. The specimens were allowed to float for 45 seconds. During that time, forceps were used to glide each specimen over the surface of the water to make sure any trapped air under the specimen escaped while making sure no water got on the dry side. After 45 seconds, the specimen was picked up from the water and placed on a scale, dry side down, to weigh the new mass including any water that was retained by the specimen. The before and after masses were compared to calculate the amount of water retained on the surface of each specimen.

Figure 18:
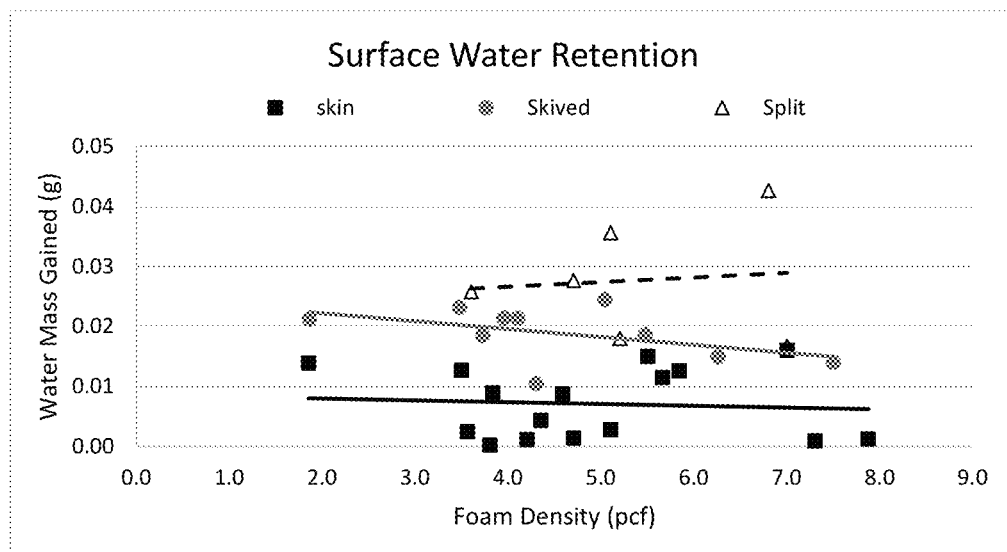
FIG. 18 is a graph of water mass gained (surface water retention) versus foam density for split foam sheets according to the present disclosure.

The average surface water retention results are shown in TABLES 14A, 14B and 14C below for each density of foam sample measured and were further graphed as shown in FIG. 18.

TABLE 14A

Skin

| Material | Foam Density (pcf) | Water mass gained (g) |
|---|---|---|
| EVA - Sample 1 | 3.6 | 0.002 |
| EVA - Sample 2 | 7.9 | 0.001 |
| EVA - Sample 3 | 4.2 | 0.001 |
| EVA - Sample 4 | 4.7 | 0.001 |
| EVA - Sample 5 | 5.1 | 0.003 |
| EVA - Sample 6 | 3.8 | 0.000 |
| EVA - Sample 7 | 7.3 | 0.001 |
| PE - Sample 1 | 1.8 | 0.014 |
| PE - Sample 2 | 3.8 | 0.009 |
| PE - Sample 3 | 5.8 | 0.013 |
| PE - Sample 4 | 7.0 | 0.016 |
| PE - Sample 5 | 5.5 | 0.015 |
| PP - Sample 1 | 3.5 | 0.013 |
| PP - Sample 2 | 4.6 | 0.009 |
| PP - Sample 3 | 4.3 | 0.004 |
| PP - Sample 4 | 5.7 | 0.011 |
| Total Average | | 0.007 |

TABLE 14B

Skived

| Material | Foam Density (pcf) | Water mass gained (g) |
|---|---|---|
| EVA - Sample 1 | 3.7 | 0.019 |
| EVA - Sample 2 | 7.5 | 0.014 |
| EVA - Sample 3 | 4.3 | 0.010 |
| PE - Sample 1 | 1.9 | 0.021 |
| PE - Sample 2 | 3.9 | 0.021 |
| PE - Sample 3 | 5.5 | 0.019 |
| PP - Sample 1 | 3.5 | 0.023 |
| PP - Sample 2 | 5.0 | 0.024 |
| PP - Sample 3 | 4.1 | 0.021 |
| PP - Sample 4 | 6.3 | 0.015 |
| Total Average | | 0.019 |

TABLE 14C

| | Split | |
|---|---|---|
| Material | Foam Density (pcf) | Water mass gained (g) |
| EVA - Sample 1 | 4.7 | 0.028 |
| EVA - Sample 2 | 5.1 | 0.036 |
| EVA - Sample 3 | 3.6 | 0.026 |
| EVA - Sample 4 | 6.8 | 0.043 |
| PE - Sample 1 | 7.0 | 0.017 |
| PP - Sample 1 | 5.2 | 0.018 |
| Total Average | | 0.028 |

As can be seen from the results of the measurements and FIG. 18, the split foam retained more water on its surface than either the standard skin or skived foam surfaces. This result is interesting in part because even a skived foam will present an open cell surface, however, the particular surface characteristics of the split foam open cell surface made it superior at retaining water, potentially due to the increase in peak heights and surface roughness as described with respect to previous examples. Comparing the total average water retention, the split foam surface retained about 3.9 times more water than the skin surfaces, and about 1.5 times more water than the skived foam surfaces.

Example 14—Adhesive Test

Foam samples produced according to the experimental method above for controlled depth crosslinking were assessed for their adhesive properties. In particular, split foam samples that were torn apart using controlled tear propagation down the intermediate/core region of the foam such as described previously with reference to FIGS. 4-6 were measured for adhesive properties on the new open cell surfaces (such as 22A or 22B as shown in FIGS. 5A and 5B) as well as measuring the same for standard foam samples that had been skived apart using a blade. Further, adhesive properties were also measured on skin side surfaces (closed cell surface, such as side A or side B in FIGS. 5A and 5B) as a control.

The adhesive test method was performed as follows. Across the width of the foam samples, 3 specimens were cut in the MD direction, 350 mm×50 mm. Both sides were then corona treated. Samples with a density lower than 3.2 pcf did not need to be treated. Samples with densities greater than 12.5 pcf were not tested. A pressure sensitive double-sided tape was prepared using a Coatema coating machine with KS900 as the release liner. 65 g/m2 of Collano T2 1434 was applied at 160° C. The foam specimen was coated on both sides with the prepared double-sided tape while avoiding trapping any air. The adhesive was rolled down twice with a 5 kg roller and a uniform speed of 600 mm/min. The specimens were die cut to 300 mm×25 mm. Release liner was removed on one side and a MYLAR PET film was placed, 0.019 mm thick, and then rolled twice with a roller as above. A plane chromium-nickel plate (50 mm×210 mm) was cleaned with 600 grit paper (in length direction only) and any shavings, grease, etc. were removed with a lint free paper soaked in benzene. About 11 cm of the other release liner was removed from the specimen and placed so the opened adhesive side was on the cleaned metal plate. Starting with the edge of the specimen at the cleaned edge of the metal plate, a roller was used to roll it down four times with a roller as above. Then, the specimen set-ups were allowed to sit for 24 hours. Subsequently, a load cell was installed in a tensile tester, distance of the grips to at 170 mm. With specimens of high density, peel was initiated with a jerky movement by hand. The free end of the metal plate was installed in the grip without the load cell, and the loose end of the specimen installed in the grip which had the load cell. Peel strength was tested at a rate of 300 mm/min and recorded in N/mm while observing the location of the peel in the sample specimen.

Figure 19:
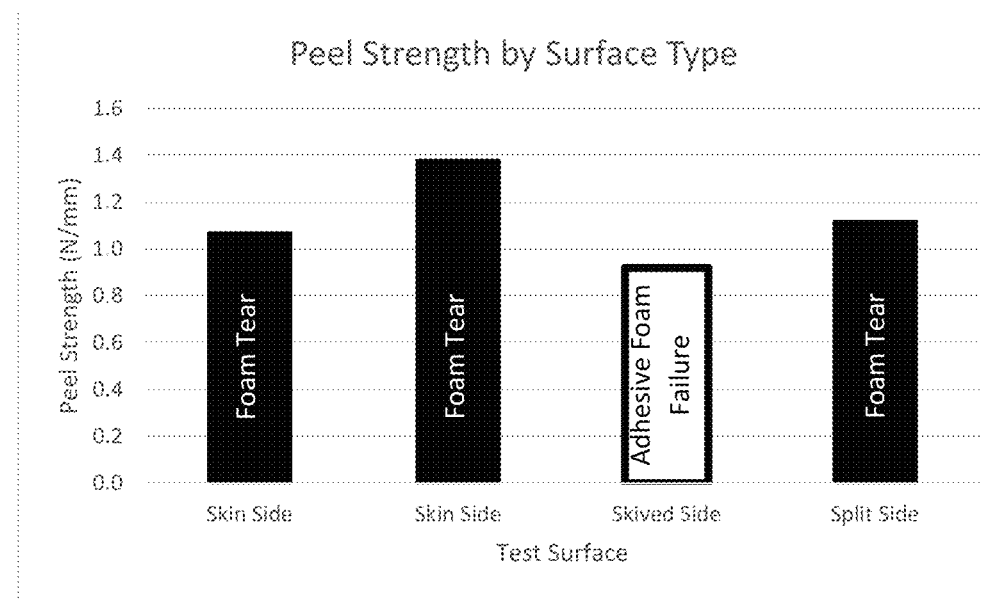
FIG. 19 is a graph of peel strength versus test surface type for split foam sheets according to the present disclosure.

The adhesive test results are shown in TABLE 15 below for each foam sample measured and were further graphed as shown in FIG. 19.

TABLE 15

| Type of foam | 4.5 pcf EVA - split foam | 4.0 pcf EVA - control foam | 4.0 pcf EVA - control foam | 4.5 pcf EVA - split foam |
|---|---|---|---|---|
| Surface tested | Skin Side | Skin Side | Skived Side | Split Side |
| Skin peel strength, MD (N/mm) | 1.070 | 1.380 | 0.920 | 1.120 |
| Failure mode | Foam Tear | Foam Tear | Adhesive Foam Failure | Foam Tear |

Regarding the failure mode, foam tear referred to a situation where the foam itself tore, whereas adhesive foam failure referred to a situation where the foam-adhesive tape interface failed, which is a sign that the adhesive is not getting a good anchorage to the foam. These test results show that the adhesive did not anchor to the skived surface very well, whereas the split foam split side resulted in a foam tear, suggesting strong adhesive anchorage. Further, the split open surface showed about the same performance as the skin side surfaces, though superior to the skived surface. Accordingly, the split foam surface according to the methods of the present disclosure performs well for adhesive tape applications.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A split, irradiation crosslinked polyolefin foam sheet comprising:
    one or more resins selected from the group consisting of low density polyethylene (LDPE), linear low density polyethylene (LLDPE), medium density polyethylene (MDPE), high density polyethylene (HDPE), ethylene vinyl acetate (EVA), polypropylene (PP), ethylene propylene diene monomer (EPDM), thermoplastic olefin (TPO), thermoplastic elastomer (TPE), and rubber;
    a skin side comprising a closed cell surface; and
    a split side comprising an open cell surface having average peak heights of about 150 μm to about 550 μm measured by selecting local high peaks relative to a base height, the base height established by the average of entire heights within a 5 mm×5 mm area of the open cell surface.

2. The split, irradiation crosslinked polyolefin foam sheet of claim 1, further comprising average peak heights of about 200 μm to about 500 μm.

3. The split, irradiation crosslinked polyolefin foam sheet of claim 1, wherein the open cell surface further comprises a surface roughness of about 70 μm to about 150 μm.

4. The split, irradiation crosslinked polyolefin foam sheet of claim 1, wherein the open cell surface further comprises a surface roughness of about 80 μm to about 135 μm.

5. The split, irradiation crosslinked polyolefin foam sheet of claim 1, wherein the open cell surface further comprises a static coefficient of friction of about 1.0 lbf to about 4.5 lbf when tested against the same open cell surface of another split polyolefin foam according to ASTM D1894.

6. The split, irradiation crosslinked polyolefin foam sheet of claim 1, wherein the open cell surface further comprises a static coefficient of friction of about 1.8 lbf to about 3.5 lbf when tested against the same open cell surface of another split polyolefin foam according to ASTM D1894.

7. The split, irradiation crosslinked polyolefin foam sheet of claim 1, wherein the open cell surface further comprises an average sound reduction of about 5 dB to about 20 dB according to the transmittance acoustic test method.

8. The split, irradiation crosslinked polyolefin foam sheet of claim 1, wherein the open cell surface further comprises an average sound reduction of about 8 dB to about 17 dB according to the transmittance acoustic test method.

9. The split, irradiation crosslinked polyolefin foam sheet of claim 1, wherein the open cell surface further comprises a surface water retention of about 0.010 grams to about 0.050 grams according to the surface water retention test method.

10. The split, irradiation crosslinked polyolefin foam sheet of claim 1, wherein the open cell surface further comprises a surface water retention of about 0.017 grams to about 0.043 grams according to the surface water retention test method.

11. The split, irradiation crosslinked polyolefin foam sheet of claim 1, wherein the open cell surface further comprises a skin peel strength of about 0.95 N/mm or greater according to the adhesive test method.

12. A process for producing the split, irradiation crosslinked polyolefin foam sheets of claim 1, comprising:
producing a crosslinked polyolefin foam sheet having an opposing first surface region and second surface region, and an intermediate region disposed therebetween, wherein the intermediate region is configured to have a gel content lower than an average gel content of the first surface region and the second surface region, and an average cell size larger than an average cell size of the first surface region and the second surface region; and
applying a splitting force to the crosslinked foam sheet such that a controlled tear propagation travels through the intermediate region until a first side of the crosslinked polyolefin foam sheet and a second side of the crosslinked polyolefin foam sheet are separated to produce two split polyolefin foam sheets.

13. The process of claim 12, wherein each of the two split polyolefin foam sheets produced have an average gauge of about 40% to about 60% of an original gauge of the crosslinked polyolefin foam sheet.

14. The process of claim 12, wherein each of the two split polyolefin foam sheets produced have an average gauge of about 45% to about 65% of an original gauge of the crosslinked polyolefin foam sheet.

15. The process of claim 12, wherein each of the two split polyolefin foam sheets produced have a mass of about 40% to about 60% of an original mass of the crosslinked polyolefin foam sheet.

16. The process of claim 12, wherein each of the two split polyolefin foam sheets produced have a mass of about 45% to about 55% of an original mass of the crosslinked polyolefin foam sheet.

17. The process of claim 12, wherein each of the two split polyolefin foam sheets produced have a density of about 85% to about 115% of an original density of the crosslinked polyolefin foam sheet.

18. The process of claim 12, wherein each of the two split polyolefin foam sheets produced have a density of about 90% to about 110% of an original density of the crosslinked polyolefin foam sheet.

19. The process of claim 12, wherein each of the two split polyolefin foam sheets produced have a maximum average gauge variance of about 5% from an ideal 50%.

20. The process of claim 12, wherein each of the two split polyolefin foam sheets produced have a maximum average mass variance of about 2% from an ideal 50%.

21. The process of claim 12, wherein each of the two split polyolefin foam sheets produced have a maximum average density variance of about 6% from an ideal 100%.

* * * * *